(12) United States Patent
Nakayama et al.

(10) Patent No.: US 9,209,677 B2
(45) Date of Patent: Dec. 8, 2015

(54) POWER CONVERSION APPARATUS

(75) Inventors: Yasushi Nakayama, Tokyo (JP); Satoshi Azuma, Tokyo (JP)

(73) Assignee: Mitsubishi Electric Corporation, Tokyo (JP)

( * ) Notice: Subject to any disclaimer, the term of this patent is extended or adjusted under 35 U.S.C. 154(b) by 145 days.

(21) Appl. No.: 13/881,765

(22) PCT Filed: Jun. 28, 2011

(86) PCT No.: PCT/JP2011/064813
§ 371 (c)(1),
(2), (4) Date: Apr. 26, 2013

(87) PCT Pub. No.: WO2012/056766
PCT Pub. Date: May 3, 2012

(65) Prior Publication Data
US 2013/0223114 A1    Aug. 29, 2013

(30) Foreign Application Priority Data
Oct. 27, 2010  (JP) ................................. 2010-240824

(51) Int. Cl.
*H02M 1/32* (2007.01)
*H02H 7/12* (2006.01)
(Continued)

(52) U.S. Cl.
CPC .............. *H02M 1/32* (2013.01); *H02H 7/1213* (2013.01); *H02H 7/1227* (2013.01);
(Continued)

(58) Field of Classification Search
CPC . H02M 1/32; H02M 7/5387; H02M 3/33507; H02M 7/53871; H02M 2001/325; H02M 3/1588; H02M 7/217; H02M 7/2173; H02M 7/487; H02M 7/537; H02M 7/797; H02H 7/1213; H02H 7/1227

USPC ............ 363/56.01, 56.02, 56.03, 97, 98, 131, 363/132
See application file for complete search history.

(56) References Cited

U.S. PATENT DOCUMENTS 6,411,534 B1 * 6/2002 Kurnia .................... H02M 1/32
363/132
7,733,616 B2 * 6/2010 Yamada ......................... 361/31
(Continued)

FOREIGN PATENT DOCUMENTS

JP   2 119530    5/1990
JP   6 54552     2/1994
(Continued)

OTHER PUBLICATIONS

International Search Report Issued Sep. 27, 2011 in PCT/JP11/64813 Filed Jun. 28, 2011.
(Continued)

*Primary Examiner* — Fred E Finch, III
(74) *Attorney, Agent, or Firm* — Oblon, McClelland, Maier & Neustadt, L.L.P.

(57) ABSTRACT

When an overcurrent detection section detects an overcurrent, a control circuit performs ON-OFF control for switching devices each switchable between a forward direction and a reverse direction, in a mode in which a current having flowed is reduced, such that when the mode is a mode in which a current is passed through any of diodes, a switching device connected in parallel with the current-passed diode is turned ON. Thus, even when an overcurrent occurs, the current flowing in the diode connected in parallel with the switching device is reduced, and the diode is protected from being deteriorated or broken by the overcurrent.

16 Claims, 13 Drawing Sheets

(51) Int. Cl.
*H02H 7/122* (2006.01)
*H02M 3/158* (2006.01)
*H02M 7/487* (2007.01)
*H02M 7/537* (2006.01)
*H02M 7/797* (2006.01)
*H02M 7/217* (2006.01)

(52) U.S. Cl.
CPC ............ *H02M 3/1588* (2013.01); *H02M 7/217* (2013.01); *H02M 7/487* (2013.01); *H02M 7/537* (2013.01); *H02M 7/797* (2013.01)

(56) References Cited

U.S. PATENT DOCUMENTS

| | | | | |
|---|---|---|---|---|
| 2003/0137858 A1* | 7/2003 | Tsuji | ........................ | H02M 1/32 363/132 |
| 2005/0036339 A1* | 2/2005 | Zverev | .............. | H02M 1/14 363/22 225 |
| 2007/0058406 A1* | 3/2007 | Inoshita et al. | ................ | 363/132 |
| 2007/0296363 A1* | 12/2007 | Andrejak | ............ | H02M 5/4585 318/504 |
| 2008/0084197 A1* | 4/2008 | Williams | ................ | H02M 1/38 323/282 |
| 2008/0205100 A1 | 8/2008 | Sakamoto | | |
| 2009/0057832 A1* | 3/2009 | Kouno | ................ | H01L 29/7397 257/577 |
| 2010/0321363 A1* | 12/2010 | Morita et al. | .................. | 345/211 |
| 2011/0170322 A1 | 7/2011 | Sato et al. | | |
| 2011/0199800 A1* | 8/2011 | Yahata et al. | .................. | 363/131 |
| 2012/0014153 A1* | 1/2012 | Christoph et al. | ............. | 363/132 |
| 2012/0182771 A1* | 7/2012 | Trainer | .................. | H02J 3/1857 363/51 |
| 2013/0307462 A1* | 11/2013 | Ohashi | .................... | H02P 27/06 318/762 |

FOREIGN PATENT DOCUMENTS

| | | |
|---|---|---|
| JP | 11 220884 | 8/1999 |
| JP | 2004 328893 | 11/2004 |
| JP | 2004 350388 | 12/2004 |
| JP | 2008 67566 | 3/2008 |
| JP | 2008 211703 | 9/2008 |
| WO | 2010 044164 | 4/2010 |

OTHER PUBLICATIONS

U.S. Appl. No. 14/364,092, filed Jun. 10, 2014, Nakayama.
Combined Office Action and Search Report issued Jul. 1, 2014 in Chinese Patent Application No. 201180052094.1 (with English translation).

* cited by examiner (a)

(b)

(a)

(b)

(a)

(b)

(a)

(b)

(a)

(b)

(a)

(b)

POWER CONVERSION APPARATUS

TECHNICAL FIELD

The present invention relates to a power conversion apparatus using a power semiconductor device, and particularly relates to protection of a diode connected in parallel with a switching device when an overcurrent flows.

BACKGROUND ART

As a conventional power conversion apparatus, for example, Patent Document 1 discloses an apparatus regarding a synchronous rectification method. Patent Document 1 describes a circuit type that allows a dead time to be minimized to reduce the number of free-wheeling diodes, with regard to a synchronous rectification method in which, in the case where an inductive load is driven, during a back-flow mode in which a current flows in a direction opposite to a forward direction of a switching device, a power switching device is ON-driven and voltage drop in the power switching device is reduced as much as possible.

Additionally, as another power conversion apparatus, for example, Patent Document 2 discloses an inverter apparatus regarding protection thereof against an overcurrent. Patent Document 2 describes an example which is characterized in that a gate voltage control circuit operates when an abnormal current flows, and an output blocking signal does not rapidly block a current during the operation, but when an overcurrent occurs, all switching devices are turned OFF.

CITATION LIST

Patent Document

Patent Document 1: Japanese Laid-Open Patent Publication No. 2008-211703
Patent Document 2: Japanese Laid-Open Patent Publication No. 06-054552

SUMMARY OF THE INVENTION

Problems to be Solved by the Invention

As in Patent Document 2, when all switching devices are turned OFF at a time of an overcurrent, the overcurrent flows in diodes connected in parallel with the switching devices. When the synchronous rectification method as disclosed in Patent Document 1 is used, if the overcurrent capacity of a diode connected in parallel with a switching device is low, particularly, for example, if the number of free-wheeling diodes is reduced and a current is caused to flow in a body diode, there is the possibility that the diode is deteriorated, or is broken in the worst case.

The present invention has been made to solve the problem described above, and an object of the present invention is to obtain a power conversion apparatus that allows a current flowing in a diode connected in parallel to a switching device to be reduced even when an overcurrent occurs, thereby protecting the diode from being deteriorated or broken by the overcurrent.

Means of Solution to the Problems

A power conversion apparatus according to the present invention is a power conversion apparatus including a positive electrode and a negative electrode constituting first input-output terminals, and upper arms and lower arms connected in series with each other between the positive electrode and the negative electrode of the first input-output terminals. Series connection points between the upper arms and the lower arms are connected to second input-output terminals. Each of the upper arms and the lower arms includes switching devices switchable between a forward direction and a reverse direction and diodes connected in parallel with the switching devices. The power conversion apparatus comprises a control circuit for performing ON-OFF control for the switching devices, current detectors for detecting current flowing in connection portions between the series connection points and the second input-output terminals, and an overcurrent detection section for detecting that a current detection value from the current detectors exceeds a predetermined overcurrent setting value. When the overcurrent detection section detects an overcurrent, the control circuit switches the ON-OFF control for the switching devices to a current reduction ON-OFF control mode which is a mode in which a current having flowed is reduced and in which when the mode is a mode in which a current is passed through any of the diodes, the switching devices connected in parallel with the current-passed diodes are turned ON.

Effect of the Invention

As described above, when a overcurrent detection section detects an overcurrent, a control circuit of a power conversion apparatus according to the present invention switches a ON-OFF control for the switching devices to a current reduction ON-OFF control mode which is a mode in which a current having flowed is reduced, and in which when the mode is a mode in which a current is passed through any of diodes, the switching devices connected in parallel with the current-passed diodes are turned ON. Thus, even when an overcurrent occurs, the current flowing in the diodes is reliably reduced, and it is possible to protect the diodes from being deteriorated or broken.

EMBODIMENTS FOR CARRYING OUT THE INVENTION

Embodiment 1

Figure 1:
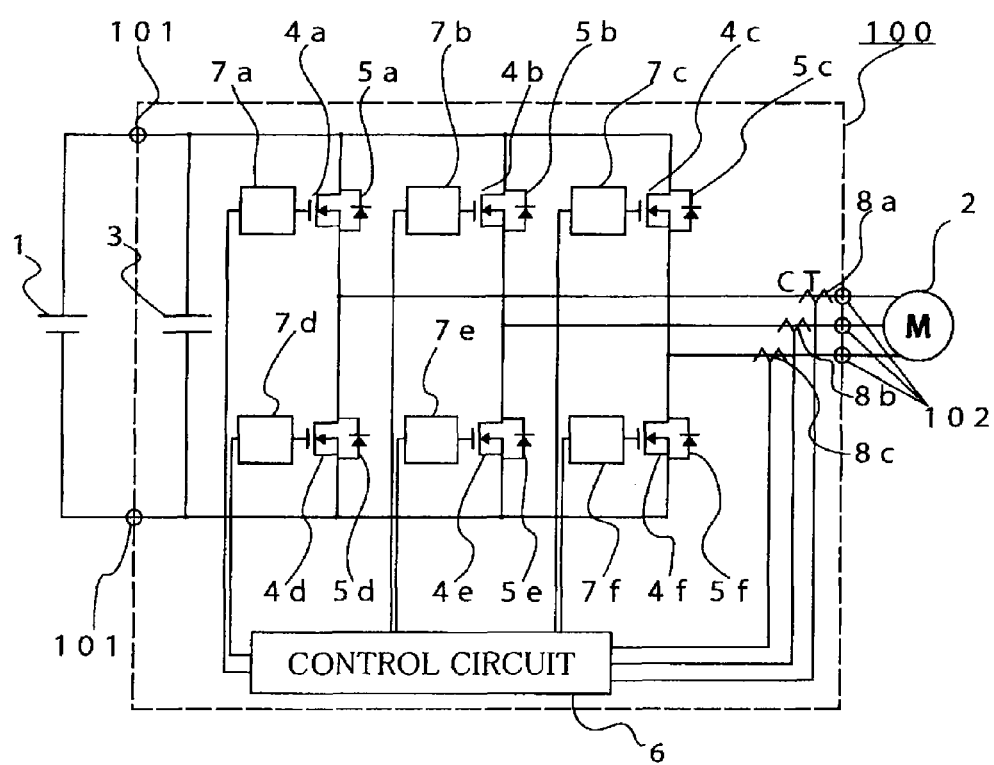
FIG. 1 is a circuit diagram showing a power conversion apparatus according to Embodiment 1 of the present invention.

FIG. 1 shows a circuit diagram of a power conversion apparatus according to Embodiment 1 of the present invention. A description will be given by using a three-phase two-level inverter as a typical example of the power conversion apparatus. In the power conversion apparatus 100, a DC power supply 1 is connected to its first input-output terminals 101, a DC voltage of the DC power supply 1 is converted to a three-phase AC voltage, and a motor 2, on an AC side, connected to second input-output terminals 102 is driven. A filter capacitor 3 is connected to the first input-output terminals 101 of the power conversion apparatus 100. Switching devices 4a to 4c and 4d to 4f for three phases are connected in series between a positive electrode and a negative electrode of the first input-output terminals 101. Each of the switching devices 4a to 4f is configured by using a device switchable between a forward direction and a reverse direction, such as a MOSFET. Diodes 5a to 5f are connected in parallel with the switching devices 4a to 4f. The switching devices 4a to 4c and the diodes 5a to 5c mounted on the positive electrode side constitute an upper arm of each phase, and the switching devices 4d to 4f and the diodes 5d to 5f mounted on the negative electrode side constitute a lower arm of each phase.

Series connection points between the switching devices 4a to 4c of the upper arms and the switching devices 4d to 4f of the lower arms are output points and are connected to the motor 2. A control circuit 6 outputs, to driving circuits 7a to 7f, control signals for turning ON and OFF the switching devices 4a to 4f, and the driving circuits 7a to 7f drive the switching devices 4a to 4f on the basis of the control signals. Current detectors 8a to 8c which detect a current of each phase are inserted between the motor 2 and the series connection points between the switching devices 4a to 4f, and detection signals of the current detectors 8a to 8c are inputted to the control circuit 6. The control circuit 6 receives the detection signals of the current detectors 8a to 8c, and includes: an overcurrent detection section which determines whether or not an overcurrent flows, namely, that a current detection value exceeds a predetermined overcurrent setting value; and a current direction detection section which detects the current directions of currents detected by the current detectors 8a to 8c.

In a normal state, a synchronous rectification method is used in which the switching device of each upper arm and the switching device of each lower arm are alternately ON-driven with a dead time interposed therebetween such that the switching devices of both arms are not simultaneously turned ON. For example, when the switching device 4a is turned OFF from a state where a current flows from the positive electrode side through the switching device 4a of the upper arm to the motor 2 side, the current having flowed in the switching device 4a is commutated to the diode 5d of the lower arm. In a dead time period, namely, in a period when both the switching device 4a of the upper arm and the switching device 4d of the lower arm are OFF, the current flows in the diode 5d of the lower arm. Thereafter, the switching device 4d of the lower arm is turned ON, and the current is divided and flows in the switching device 4d and the diode 5d of the lower arm. It should be noted that the current division ratio between the switching device 4d and the diode 5d is determined by the device characteristics, and the current may flow only in the switching device depending the device characteristics. In addition, if a method for shortening a dead time as much as possible is used as in Patent Document 1, it is also possible to shorten a period when the current does not flow in the switching device and flows only in the diode.

In the case where such a synchronous rectification method is used, a period when the current flows only in the diode is short, and in the other period as well, even when the current flows in the diode, the current is divided and flows in the diode and the switching device. Thus, it is possible to decrease the capacity of the diode as compared to the case where the synchronous rectification method is not used. In some cases, it is also possible to use a body diode of the switching device.

It should be noted that in application of the present invention, the synchronous rectification method may not be necessarily used as a control operation in a normal state. The same also applies to the cases of Embodiment 2 and the subsequent embodiments.

Figure 2:
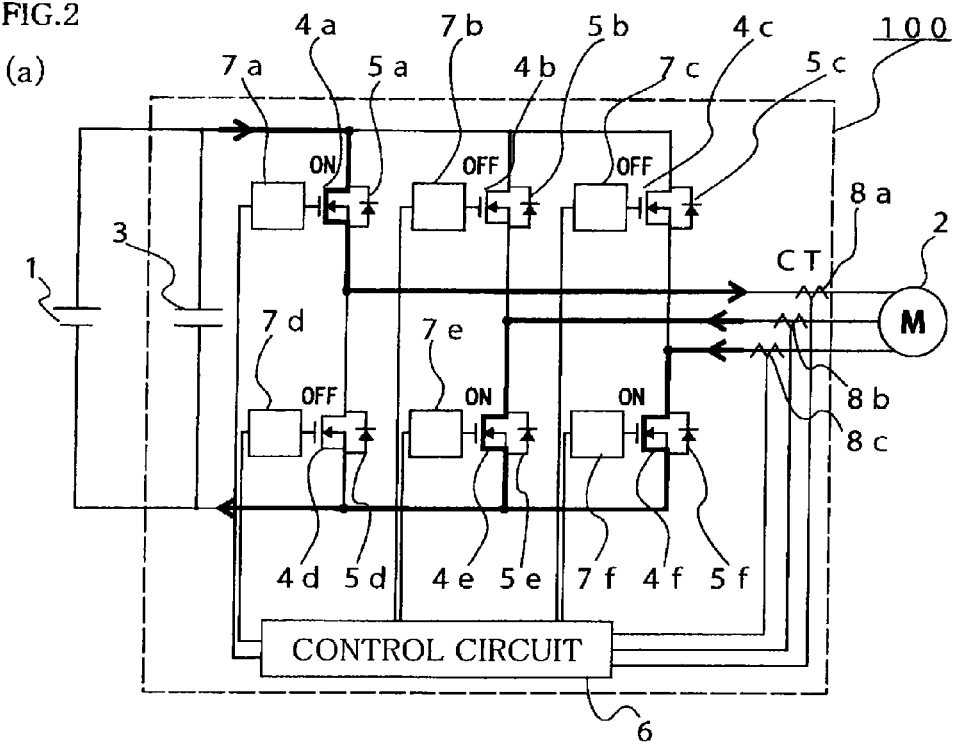
FIG. 2 is a circuit diagram showing an operation of the power conversion apparatus according to Embodiment 1 of the present invention at a time of overcurrent detection.
Figure 2:
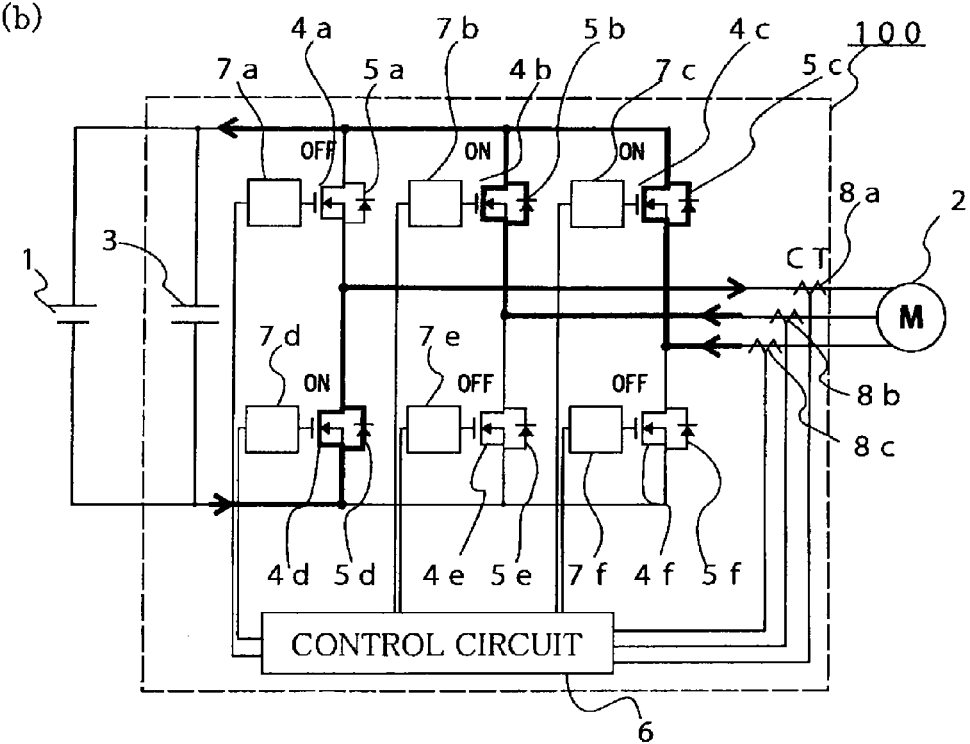

Next, an operation at a time of overcurrent occurrence will be described based on FIG. 2. If all the switching devices are turned OFF at a time of overcurrent detection as in Patent Document 2, a problem arises that the overcurrent flows in the diode. However, by turning ON the switching device connected in parallel with the diode in which the overcurrent flows, it is possible to protect the diode. FIG. 2(a) shows a state where an overcurrent flows, and a case is assumed in which the switching devices 4a, 4e, and 4f are ON and the current flows in the forward directions of the switching devices 4a, 4e, and 4f. When the overcurrent flows, the control circuit 6 receives detection signals from the current detectors 8a to 8c, detects occurrence of the overcurrent with its overcurrent detection section, and determines which switching device is to be turned ON and which switching device is to be turned OFF, on the basis of the flowing direction of the overcurrent which is detected by its current direction detection section. In other words, the switching device of the upper arm of a phase in which a current flows out from the series connection point between the upper and lower arms within the power conversion apparatus 100 to the motor 2 on the AC side is turned OFF, the switching device of the lower arm of the phase is turned ON, the switching device of the lower arm of a phase in which a current flows from the motor 2 on the AC side through the series connection point into the power conversion apparatus 100 is turned OFF, the switching device of the upper arm of the phase is turned ON.

FIG. 2(b) shows a state after the protection operation described above. In this example, at a time of overcurrent detection (FIG. 2(a)), the switching device 4a of the upper arm of the phase in which the current flows out from the series connection point within the power conversion apparatus 100 to the motor 2 on the AC side is turned OFF, the switching device 4d of the lower arm of the phase is turned ON, the switching devices 4e and 4f of the lower arms of the phases in which the current flows from the motor 2 on the AC side through the series connection points into the power conversion apparatus 100 are turned OFF, and the switching devices 4b and 4c of the upper arms of the phases are turned ON. By performing such control, a circuit operation is performed in which the filter capacitor 3 is charged while the current is divided and flows in the diode and the switching device, and thus the current is attenuated.

That is, when the overcurrent detection section detects occurrence of an overcurrent, the control circuit 6 switches ON-OFF control for each switching device to a current reduction ON-OFF control mode which is a mode in which a current having flowed is reduced and in which current reduction ON-OFF control mode, when the mode is a mode in which a current is passed through any of the diodes, the switching device connected in parallel with the current-passed diode is turned ON. Here, the current reduction ON-OFF control mode is a charge ON-OFF control mode in which the filter capacitor 3 is charged. Each of the switching devices (4b, 4c, and 4d) that are caused to perform an ON-operation in this control mode has a role in causing the current to be divided and flow in the switching device and the diodes (5b, 5c, and 5d) connected in parallel therewith, thereby further reducing the current flowing in this diode.

Then, after the current is reduced to such an extent as not to influence deterioration and breakage of the diode and becomes equal to or less than a predetermined lower limit, the switching devices that have been ON are turned OFF, whereby it is possible to block the current. In the case of three phases, the switching devices may be turned OFF in order from the phase in which the current is reduced to such an extent as not to influence deterioration and breakage of the diode.

When all the switching devices are turned OFF at a time of overcurrent detection as in Patent Document 2, no current flows in the switching devices, and a current flows only in the diodes. On the other hand, in the present invention, the current is divided and flows in the switching device and the diode. Thus, it is possible to prevent deterioration or breakage of the diode. Particularly, for example, by using the synchronous rectification method, the advantageous effect of the present invention is increased when the overcurrent capacity of the diode is low, for example, when a body diode of the switching device is used as the diode.

As described above, in Embodiment 1 of the present invention, in the three-phase two-level inverter as the power conversion apparatus, when an overcurrent is detected, the ON-OFF control mode that has been set for the switching devices is switched to the charge ON-OFF control mode in which the filter capacitor is charged and which is the current reduction ON-OFF control mode in which the current having flowed is reduced. Thus, the switching device connected in parallel with the diode through which the current is passed at the same time is turned ON, and the current is divided and flows also in the switching device. Therefore, the current flowing in the diode is considerably reduced, deterioration or breakage of the diode due to occurrence of an overcurrent is prevented, and the durability is improved.

It should be noted that the case of, as the power conversion apparatus, the inverter which converts DC power to AC power has been described in this example, but the power conversion apparatus may be a converter which converts AC power to DC power as long as the converter includes switching devices in an upper arm and a lower arm and diodes in parallel with the switching devices.

Embodiment 2

Figure 3:
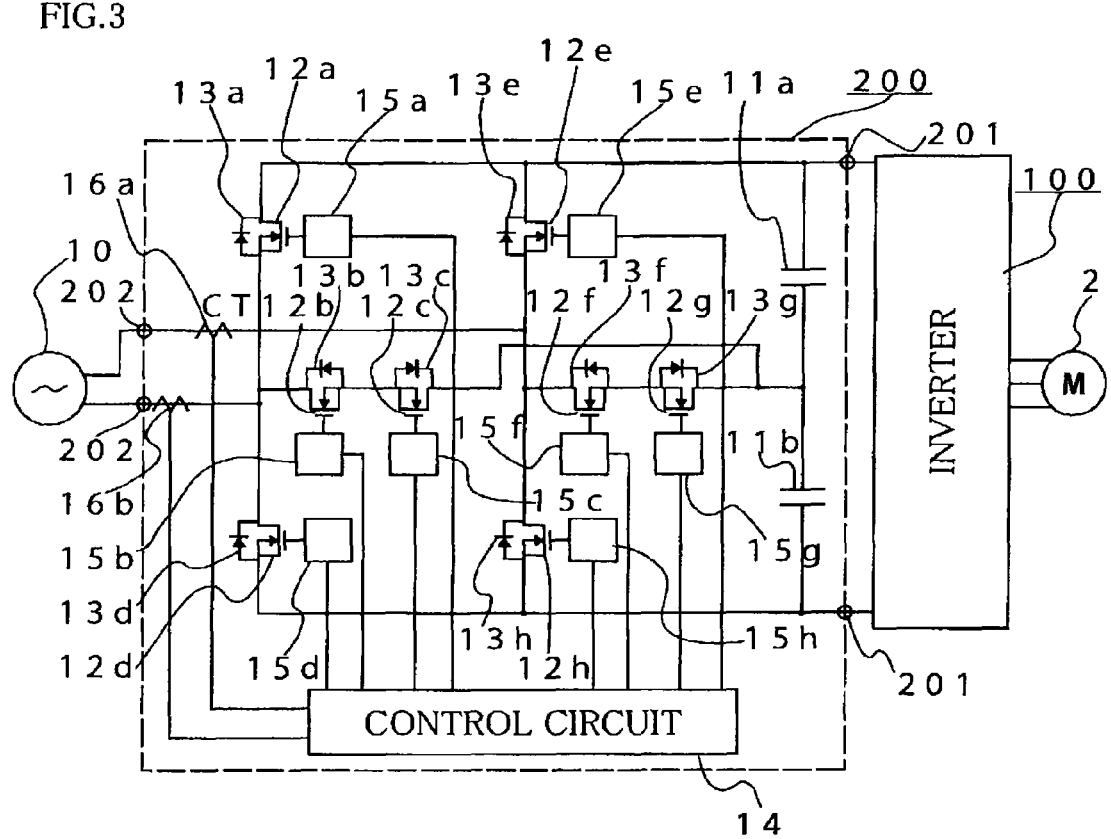
FIG. 3 is a circuit diagram showing a power conversion apparatus according to Embodiment 2 of the present invention.

In the above Embodiment 1, the case of the two-level power conversion apparatus has been described. However, in the present embodiment, a case of a three-level power conversion apparatus which includes an intermediate electrode in addition to a positive electrode and a negative electrode will be described. FIG. 3 shows a circuit diagram of the power conversion apparatus according to Embodiment 2. The power conversion apparatus 200 in FIG. 3 is a single-phase three-level converter which converts AC power of a single-phase AC power supply 10 connected to second input-output terminals 202 to DC power and outputs the DC power from first input-output terminals 201, and is described as being used as a DC power supply for the power conversion apparatus 100 described in the above Embodiment 1.

Since the three-level power conversion apparatus 200 includes the positive electrode, the negative electrode, and the intermediate electrode, a positive electrode-side filter capacitor 11a and a negative electrode-side filter capacitor 11b are used in the three-level power conversion apparatus 200. Switching devices 12a and 12e of upper arms and switching devices 12d and 12h of lower arms are mounted between the positive electrode side and the negative electrode side so as to be connected in series with each other, and series connection points therebetween are connected to the single-phase AC power supply 10. In addition, switching devices 12b and 12c and switching devices 12f and 12g which constitute intermediate arms each outputting an intermediate potential are mounted in anti-series with each other between these series connection points and a connection point (the intermediate electrode) between the positive electrode-side filter capacitor 11a and the negative electrode-side filter capacitor 11b.

Each of the switching devices 12a to 12h is configured by using a device switchable between a forward direction and a reverse direction, such as a MOSFET. In addition, diodes 13a to 13h are connected in parallel with the respective switching devices.

A control circuit 14 outputs, to driving circuits 15a to 15h, control signals for turning ON and OFF the switching devices 12a to 12h, and the driving circuits 15a to 15h drive the switching devices 12a to 12h on the basis of the control signals. Current detectors 16a and 16b which detect a current of each phase of the single-phase AC power supply 10 are mounted, and detection signals of the current detectors 16a and 16b are inputted to the control circuit 14. The control circuit 14 receives the detection signals of the current detectors 16a and 16b, and includes: an overcurrent detection section which determines whether or not an overcurrent flows, namely, that a current detection value exceeds a predetermined overcurrent setting value; and a current direction detection section which detects the current directions of currents detected by the current detectors 16a and 16b.

In such a three-level power conversion apparatus as well, in a normal state, the synchronous rectification method is used in which when a current flows in the forward direction of the diode, the switching device connected in parallel with the diode is turned ON. Thus, it is possible to cause the current flowing in the diode to be divided and flow in the switching device, it is possible to decrease the capacity of the diode, and in some cases, it is also possible to use a body diode of the switching device.

Figure 4:
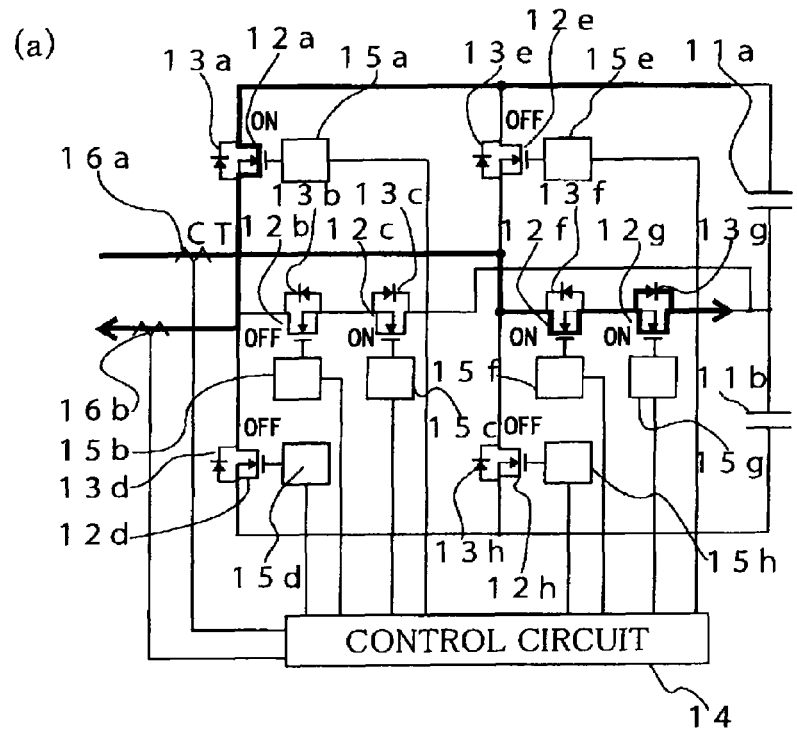
FIG. 4 is a circuit diagram showing an operation of the power conversion apparatus according to Embodiment 2 of the present invention at a time of overcurrent detection.
Figure 4:
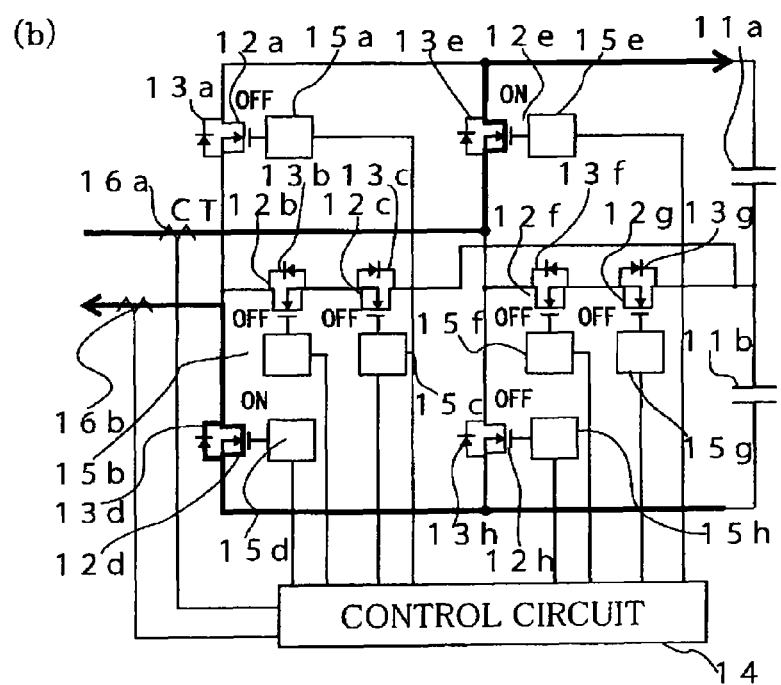

An operation of the three-level power conversion apparatus 200 at a time of overcurrent occurrence will be described with reference to FIG. 4. In FIG. 4(a), a case where an overcurrent flows is assumed, and the overcurrent flows from the power conversion apparatus 200 side through the switching device 12a to the single-phase AC power supply 10 side and from the single-phase AC power supply 10 side through the switching devices 12f and 12g to the power conversion apparatus 200 side. When the overcurrent flows, the control circuit 14 receives detection signals from the current detectors 16a and 16b and detects the overcurrent with its overcurrent detection section. Then, for switching to a current reduction ON-OFF control mode, the control circuit 14 determines which switching device is to be turned ON and which switching device is to be turned OFF, on the basis of the flowing direction of the current which is detected by its current direction detection section.

In the above Embodiment 1, the ON-OFF control is for the switching devices of the upper arms and the lower arms. However, in the case of the three-level power conversion apparatus, it is also necessary to take into consideration ON-OFF control for the switching devices of the intermediate arms.

In order to speed up attenuation of a current, it is preferable to perform a charging operation in which the current is returned to both the filter capacitors 11a and 11b. For this, it is preferable to cause no current to flow in the switching devices 12b, 12c, 12f, and 12g, and the diodes 13b, 13c, 13f, and 13g of the intermediate arms. Thus, for a phase in which a current flows out from the series connection point between the upper and lower arms within the power conversion apparatus 200 to the single-phase AC power supply 10 side, the switching device of the upper arm is controlled to be OFF, and the switching device of the lower arm is controlled to be ON; and for a phase in which a current flows from the single-phase AC power supply 10 side through the series connection point into the power conversion apparatus 200, the switching device of the lower arm is controlled to be OFF, the switching device of the upper arm is controlled to be ON, and the switching device of the intermediate arm is controlled to be OFF.

FIG. 4(b) shows a state after the protection operation described above. In this example, at a time of overcurrent detection (FIG. 4(a)), for the phase in which the current flows out from the series connection point within the power conversion apparatus 200 to the single-phase AC power supply 10 side, the switching device 12a of the upper arm is controlled to be OFF, the switching device 12d of the lower arm is controlled to be ON, and the switching device 12c of the intermediate arm is controlled to be OFF from ON. For the phase in which the current flows from the single-phase AC power supply 10 side through the series connection point into the power conversion apparatus 200, the switching device 12h of the lower arm is kept OFF, the switching devices 12f and 12g of the intermediate arm are controlled to be OFF, and the switching device 12e of the upper arm is controlled to be ON. By performing such control, the ON-OFF control mode that has been set is switched to a charge ON-OFF control mode in which both filter capacitors 11a and 11b are charged and which is the current reduction ON-OFF control mode, and the current is reduced from the overcurrent state. At the same time, the current is divided and flows in the switching devices 12d and 12e and the diodes 13d and 13e. Thus, the current in each current-passed diode is further attenuated.

Thereafter, when the current is reduced to such an extent as not to influence deterioration and breakage of each diode, the switching devices that have been ON are turned OFF, whereby it is possible to block the current.

As described above, in Embodiment 2 of the present invention, in the single-phase three-level converter as the power conversion apparatus, when an overcurrent is detected, the ON-OFF control mode that has been set for the switching devices is switched to the charge ON-OFF control mode in which the positive electrode-side filter capacitor and the negative electrode-side filter capacitor are charged and which is the current reduction ON-OFF control mode in which the current having flowed is reduced. Thus, the switching device connected in parallel with the diode through which the current is passed at the same time is turned ON, and the current is divided and flows also in the switching device. Therefore, the current flowing in the diode is considerably reduced, deterioration or breakage of the diode due to occurrence of an overcurrent is prevented, and the durability is improved. Particularly, since the operation is performed in which both filter capacitors are charged, there is an advantage that attenuation of the current is sped up.

It should be noted that the case of, as the power conversion apparatus, the single-phase three-level converter which converts single-phase AC power to DC power has been described in the present embodiment, but the present embodiment is also applicable to a case of converting three-phase AC power to DC power and a case of using a three-level inverter which converts DC power to single-phase or three-phase AC power.

Embodiment 3

Figure 5:
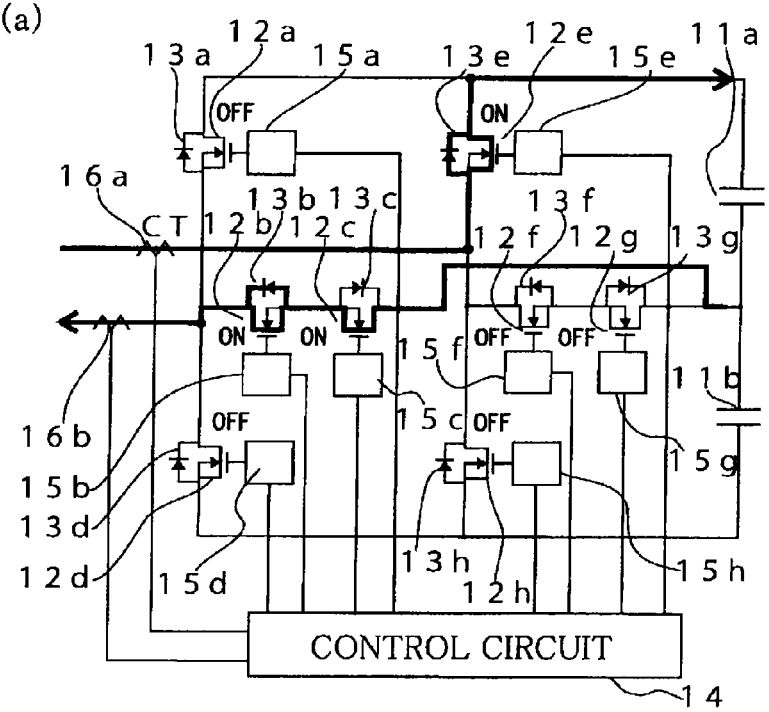
FIG. 5 is a circuit diagram showing an operation of a power conversion apparatus according to Embodiment 3 of the present invention at a time of overcurrent detection.
Figure 5:
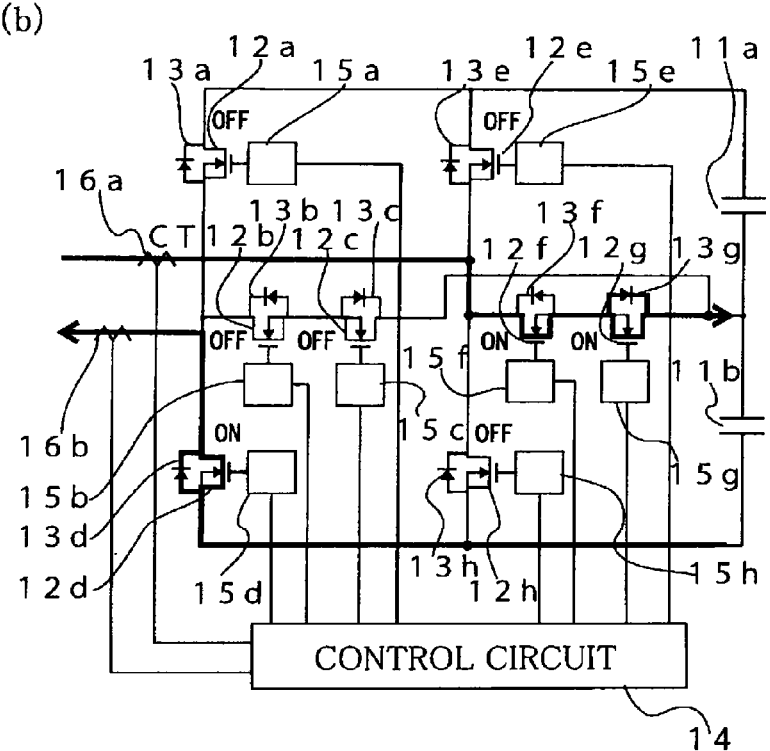

FIG. 5 shows a circuit diagram of a power conversion apparatus according to Embodiment 3 of the present invention. Similarly to the above Embodiment 2, the present embodiment is also a case of a three-level power conversion apparatus. The three-level power conversion apparatus includes a positive electrode, a negative electrode, and an intermediate electrode. Thus, as a current reduction ON-OFF control mode, it is possible to cause a current to flow in directions in which both positive electrode-side and negative electrode-side filter capacitors connected in series between the positive electrode and the negative electrode are charged, thereby attenuating the current, as in Embodiment 2, but it is also possible to cause a current to flow in a direction in which the capacitor on one side is charged, thereby attenuating the current. The present embodiment relates to such a control method.

FIGS. 5(a) and 5(b) are each an example in which control is performed such that a current flows in a direction in which the filter capacitor on one side is charged. In FIG. 5(a), control is performed such that a current flows in a direction in which the positive electrode-side filter capacitor 11a is charged, and in FIG. 5(b), control is performed such that a current flows in a direction in which the negative electrode-side filter capacitor 11b is charged. Here, similarly to the case of Embodiment 2, an overcurrent in the state of FIG. 4(a) is assumed, and a control method after a protection operation is performed from this state, namely, a charge ON-OFF control mode as the current reduction ON-OFF mode, is shown.

First, in order to cause a current to flow in the direction in which the positive electrode-side filter capacitor 11a is charged, for a phase in which a current flows out from the series connection point within the power conversion apparatus to the single-phase AC power supply side, the switching devices of the upper arm and the lower arm are controlled to be OFF, and the two switching devices of the intermediate arm are controlled to be ON; and for a phase in which a current flows from the single-phase AC power supply side through the series connection point into the power conversion apparatus, the switching device of the lower arm and the two switching devices of the intermediate arm are controlled to be OFF, and the switching device of the upper arm is controlled to be ON.

In the example of FIG. 5(a), the switching device 12a of the upper arm of the phase in which the current flows out from the series connection point within the power conversion apparatus to the single-phase AC power supply side is turned OFF from ON, the switching device 12b of the intermediate arm of the phase is turned ON from OFF, the switching device 12d of the lower arm of the phase is kept OFF, and the other switching device 12c of the intermediate arm of the phase is kept ON. The two switching devices 12f and 12g of the intermediate arm of the phase in which the current flows from the single-phase AC power supply side through the series connection point into the power conversion apparatus are turned OFF from ON, the switching device 12e of the upper arm of the phase is turned ON from OFF, and the switching device 12h of the lower arm of the phase is kept OFF.

In order to cause a current to flow in the direction in which the negative electrode-side filter capacitor 11b is charged, for the phase in which the current flows out from the series connection point within the power conversion apparatus to the single-phase AC power supply side, the switching device of the upper arm and the two switching devices of the intermediate arm are controlled to be OFF, and the switching device of the lower arm is controlled to be ON; and for the phase in which the current flows from the single-phase AC power supply side through the series connection point into the power conversion apparatus, the switching devices of the upper arm and the lower arm are controlled to be OFF, and the two switching devices of the intermediate arm are controlled to be ON.

In the example of FIG. 5(b), the switching device 12a of the upper arm and the switching device 12c of the intermediate arm of the phase in which the current flows out from the series connection point within the power conversion apparatus to the single-phase AC power supply side are turned OFF from ON, the switching device 12d of the lower arm of the phase is turned ON from OFF, and the switching device 12b of the intermediate arm of the phase is kept OFF. The switching device 12e of the upper arm and the switching device 12h of the lower arm of the phase in which the current flows from the single-phase AC power supply side through the series connection point into the power conversion apparatus are kept OFF, and the two switching devices 12f and 12g of the intermediate arm of the phase are kept ON.

In the present embodiment, since the charge ON-OFF control mode is such that only either the positive electrode-side filter capacitor 11a or the negative electrode-side filter capacitor 11b is charged, attenuation of the current slows down as compared to Embodiment 2. However, in the present embodiment as well, a current does not flow only in the diode, and is divided and flows in the switching device and the diode. Thus, it is possible to protect the current-passed diode from being deteriorated or broken. Particularly, when a body diode of the switching device is used as the diode, the effect is increased since the overcurrent capacity of the body diode is low.

It should be noted that the following method is conceived as a method for determining which to select the positive electrode-side filter capacitor 11a or the negative electrode-side filter capacitor 11b as a charging target in the charge ON-OFF control mode in the present embodiment.

For example, a method is conceived in which a capacitor voltage comparison section is provided which compares the voltages of the positive electrode-side filter capacitor 11a and the negative electrode-side filter capacitor 11b when the overcurrent detection section detects an overcurrent, a capacitor whose voltage is determined to be lower as a result of the comparison by the capacitor voltage comparison section is selected from the positive electrode-side filter capacitor 11a and the negative electrode-side filter capacitor 11b, and an operation of charging the selected capacitor is performed. In this case, due to this charging operation, there is an advantage that an operation is performed such that the voltages of both capacitors are balanced.

In addition, as another method, a method is conceived in which a capacitor discharging detection section is provided which detects discharging operations of the positive electrode-side filter capacitor 11a and the negative electrode-side filter capacitor 11b when the overcurrent detection section detects an overcurrent, on the basis of the ON-OFF states of the switching devices, the flowing direction of the overcurrent, and the like; and when discharging of either the positive electrode-side filter capacitor 11a or the negative electrode-side filter capacitor 11b is detected by the capacitor discharging detection section, the capacitor whose discharging has been detected is selected, and an operation of charging the selected capacitor is performed.

It should be noted that when the voltages of both capacitors are substantially the same or when discharging of both capacitors is detected, both capacitors may be charged to speed up reduction of the current, similarly to the case of the above Embodiment 2; and when the voltage of the capacitor on one side is high and the voltage becomes excessively high if both capacitors are charged, only the capacitor having a low voltage may be charged.

As described above, in Embodiment 3 of the present invention, in the single-phase three-level converter as the power conversion apparatus, when an overcurrent is detected, the ON-OFF control mode that has been set for the switching devices is switched to the charge ON-OFF control mode in which either the positive electrode-side filter capacitor or the negative electrode-side filter capacitor is charged and which is the current reduction ON-OFF control mode in which the current having flowed is reduced. Thus, the switching device connected in parallel with the diode through which the current is passed at the same time is turned ON, and the current is divided and flows also in the switching device. Therefore, the current flowing in the diode is considerably reduced, deterioration or breakage of the diode due to occurrence of an overcurrent is prevented, and the durability is improved.

Embodiment 4

Figure 6:
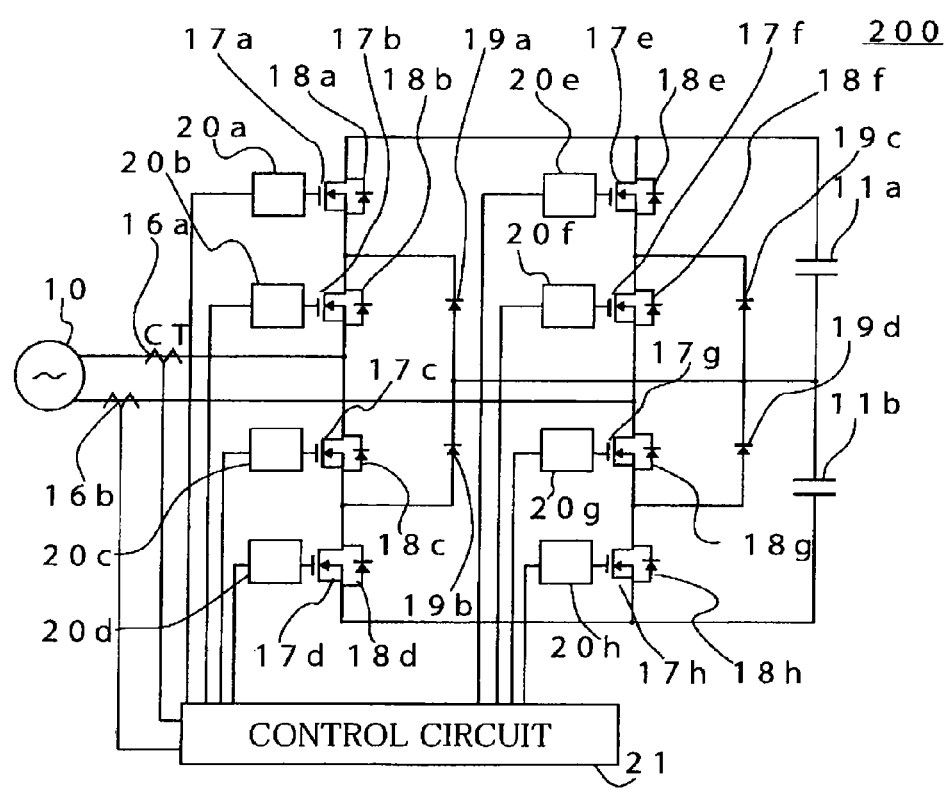
FIG. 6 is a circuit diagram showing a power conversion apparatus according to Embodiment 4 of the present invention.

FIG. 6 shows a circuit diagram of a power conversion apparatus according to Embodiment 4 of the present invention. The present embodiment is also a three-level power conversion apparatus which includes a positive electrode, a negative electrode, and an intermediate electrode, but shows a case where a circuit configuration is different from those in the above Embodiments 2 and 3. Between the positive electrode and the negative electrode, first switching devices 17a and 17e, second switching devices 17b and 17f, third switching devices 17c and 17g, and fourth switching devices 17d and 17h are connected in four series in each phase in order from the positive electrode side, and connection points between the second and third switching devices are connected to the single-phase AC power supply 10.

Each of the first to fourth switching devices 17a to 17h is configured by using a device switchable between a forward direction and a reverse direction, such as a MOSFET.

In addition, diodes 18a to 18h are connected in parallel with the first to fourth switching devices 17a to 17h. Moreover, clamping diodes 19a to 19d are connected between: the connection point between the positive electrode-side and negative electrode-side filter capacitors 11a and 11b; and the connection points between the first and second switching devices and the connection points between the third and fourth switching devices.

The first and second switching devices 17a, 17b, 17e, and 17f, the diodes 18a, 18b, 18e, and 18f, and the clamping diodes 19a and 19c form an upper arm of each phase, and the third and fourth switching devices 17c, 17d, 17g, and 17h, the diodes 18c, 18d, 18g, and 18h, and the clamping diodes 19b and 19d form a lower arm of each phase.

When such a three-level power conversion apparatus is used, since the three-level power conversion apparatus includes the clamping diodes 19a-19d, the number of devices is increased as compared to Embodiments 2 and 3. However, since the devices are connected in four series between the positive and negative electrodes, there is an advantage that a voltage applied to each switching device is reduced and it is possible to use devices having low rated voltages.

In such a three-level power conversion apparatus as well, in a normal state, the synchronous rectification method is used in which when a current flows in the forward direction of the diode, the switching device connected in parallel with the diode is turned ON. Thus, it is possible to cause the current flowing in the diode to be divided and flow in the switching device, it is possible to decrease the capacity of the diode, and in some cases, it is also possible to use a body diode of the switching device as the diode.

Figure 7:
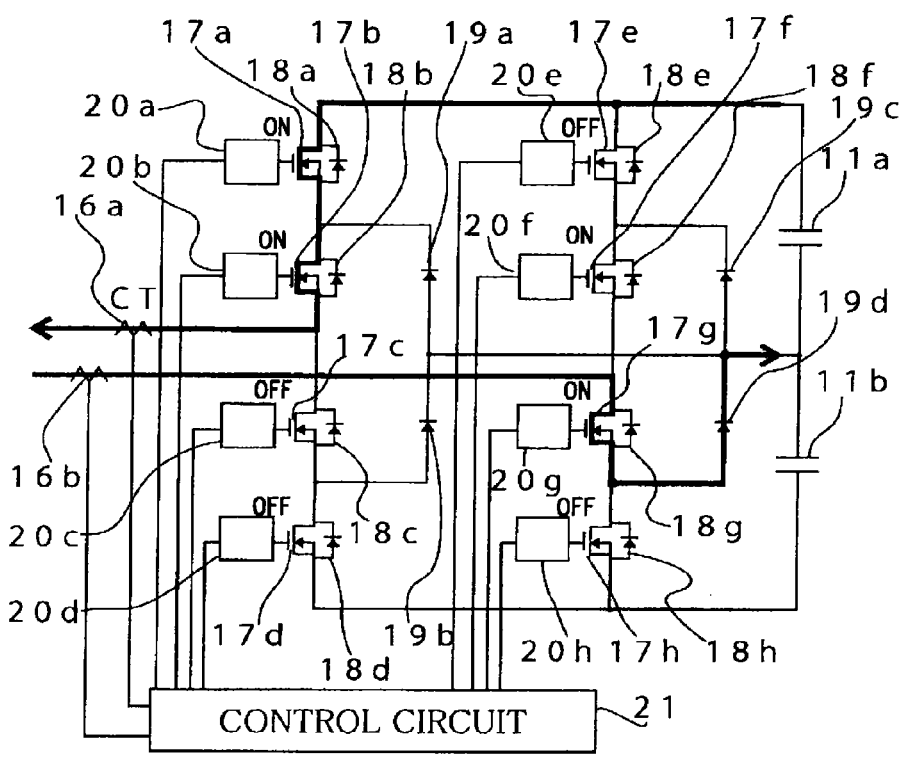
FIG. 7 is a circuit diagram showing an operation of the power conversion apparatus according to Embodiment 4 of the present invention at a time of overcurrent detection.
Figure 7:
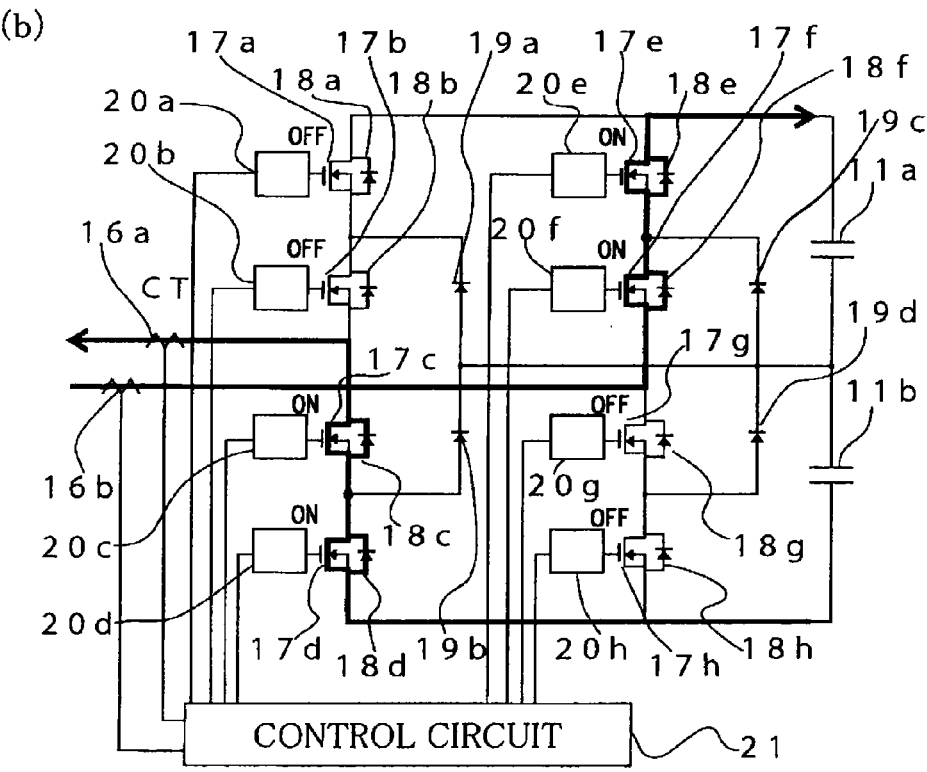

An operation at a time of overcurrent occurrence will be described with reference to FIG. 7. In FIG. 7(a), a case where an overcurrent flows is assumed, and the overcurrent flows from the power conversion apparatus 200 side through the switching devices 17a and 17b to the single-phase AC power supply 10 side and from the single-phase AC power supply 10 side through the switching device 17g and the clamping diode 19d to the power conversion apparatus 200 side. When the overcurrent flows, a control circuit 21 receives detection signals from the current detectors 16a and 16b and detects the overcurrent with its overcurrent detection section. Then, for switching to a current reduction ON-OFF control mode, the control circuit 21 determines which switching device is to be turned ON and which switching device is to be turned OFF, on the basis of the flowing direction of the current which is detected by its current direction detection section.

The point that the switching devices are connected in series is a difference from the case of the above Embodiment 2. However, in the present embodiment as well, for a phase in which a current flows out from the power conversion apparatus 200 side to the single-phase AC power supply 10 side, the switching devices of the upper arm are controlled to be OFF, and the switching devices of the lower arm are controlled to be ON. For a phase in which a current flows from the single-phase AC power supply 10 side into the power conversion apparatus 200, the switching devices of the lower arm are controlled to be OFF, and the switching devices of the upper arm are controlled to be ON.

FIG. 7(b) shows a state after the overcurrent protection operation. In this example, at a time of overcurrent detection (FIG. 7(a)), the switching devices 17a and 17b which are the switching devices of the upper arm of the phase in which the current flows out from the power conversion apparatus 200 to the single-phase AC power supply 10 side are controlled to be OFF, and the switching devices 17c and 17d which are the switching devices of the lower arm of the phase are controlled to be ON. For the phase in which the current flows from the single-phase AC power supply 10 side into the power conversion apparatus 200, the switching device 17g of the lower arm is turned OFF, the switching device 17h of the lower arm is kept OFF, the switching device 17e of the upper arm is turned ON, and the switching device 17f of the upper arm is kept ON. Thus, the current is attenuated while flowing through the switching devices 17c, 17d, 17e, and 17f and the diodes 18c, 18d, 18e, and 18f.

Thereafter, when the current is reduced to such an extent as not to influence deterioration and breakage of each diode, the switching devices that have been ON are turned OFF, whereby it is possible to block the current.

As described above, in Embodiment 4 of the present invention, in the single-phase three-level converter as the power conversion apparatus, when an overcurrent is detected, the ON-OFF control mode that has been set for the switching devices is switched to the charge ON-OFF control mode in which the positive electrode-side filter capacitor and the negative electrode-side filter capacitor are charged and which is the current reduction ON-OFF control mode in which the current having flowed is reduced. Thus, the switching device connected in parallel with the diode through which the current is passed at the same time is turned ON, and the current is divided and flows also in the switching device. Therefore, the current flowing in the diode is considerably reduced, deterioration or breakage of the diode due to occurrence of an overcurrent is prevented, and the durability is improved. Particularly, since the operation is performed in which both filter capacitors are charged, there is an advantage that attenuation of the current is sped up.

It should be noted that the case of the single-phase three-level converter as the power conversion apparatus has been described in the present embodiment, but the present embodiment is also applicable to a case of three phases and a case of using an inverter.

Embodiment 5

Figure 8:
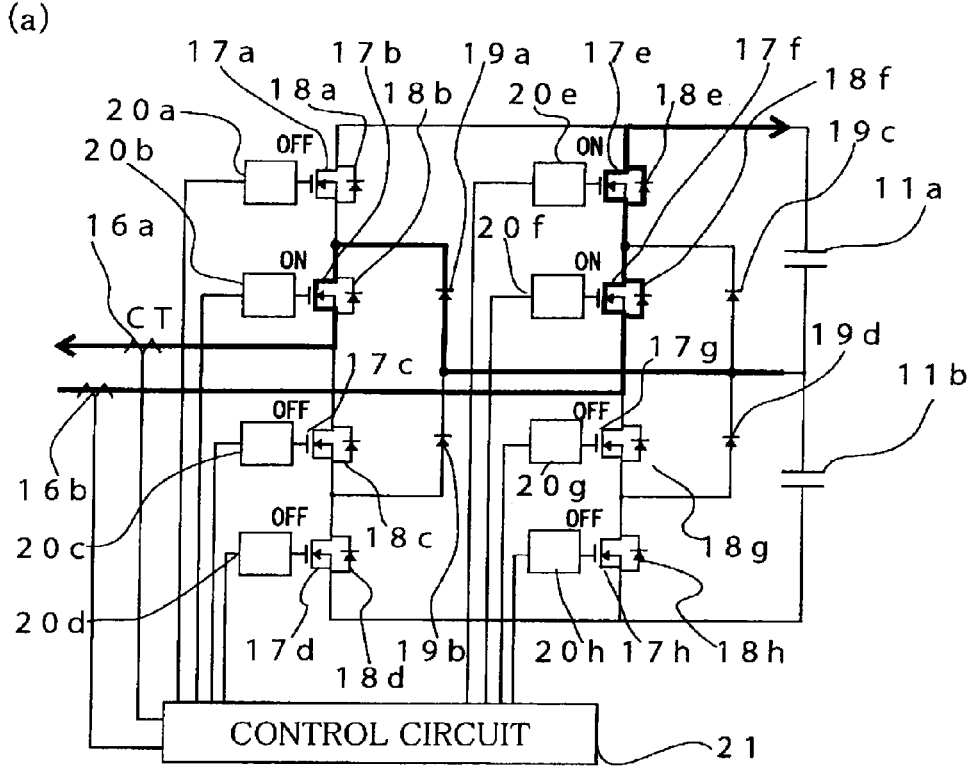
FIG. 8 is a circuit diagram showing an operation of a power conversion apparatus according to Embodiment 5 of the present invention at a time of overcurrent detection.
Figure 8:
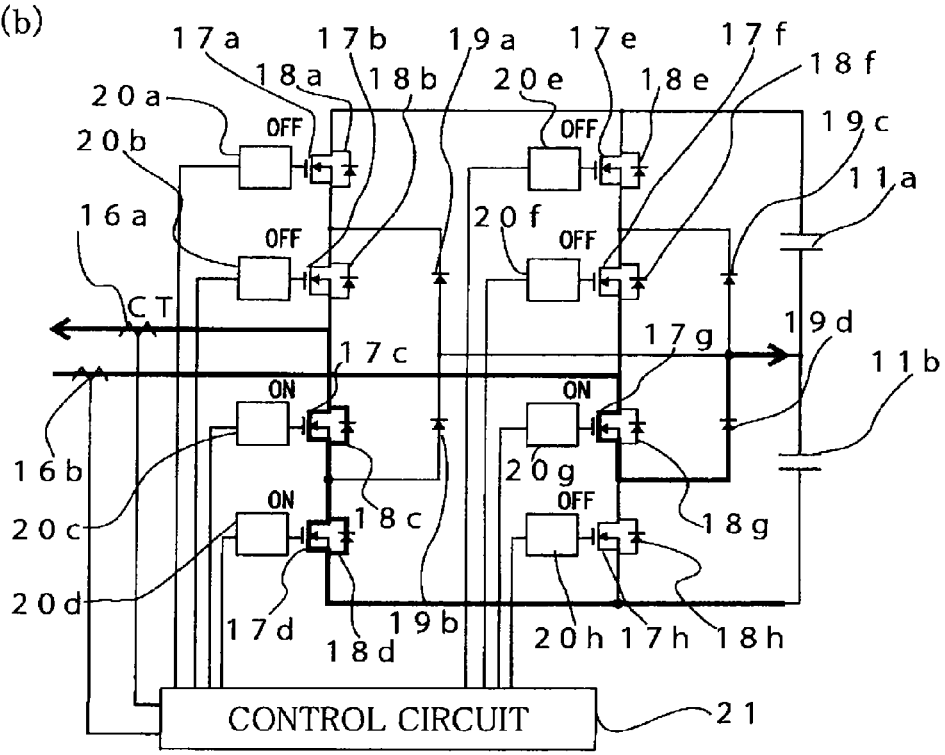

FIG. 8 shows a circuit diagram of a power conversion apparatus according to Embodiment 5 of the present invention. The present embodiment relates to a case where in a three-level power conversion apparatus having the same circuit configuration as that in the above Embodiment 4, control is performed such that a current flows in a direction in which the filter capacitor on one of the positive electrode side and the negative electrode side is charged, as described in Embodiment 3.

FIG. 8(a) shows a case where from the overcurrent state in FIG. 7(a), control is performed such that a current flows in the direction in which the positive electrode-side filter capacitor 11a is charged, and FIG. 8(b) shows a case where from the overcurrent state in FIG. 7(a), control is performed such that a current flows in the direction in which the negative electrode-side filter capacitor 11b is charged. In the case where a current is caused to flow in the direction in which the positive electrode-side filter capacitor 11a is charged, for a phase in which a current flows out from the power conversion apparatus 200 side to the single-phase AC power supply 10 side, the first, third, and fourth switching devices are turned OFF, and the second switching device is turned ON; and for a phase in which a current flows from the single-phase AC power supply 10 side into the power conversion apparatus 200, the third and fourth switching devices are turned OFF, and the first and second switching devices are turned ON.

In the case where a current is caused to flow in the direction in which the negative electrode-side filter capacitor 11b is charged, for the phase in which the current flows out from the power conversion apparatus 200 side to the single-phase AC power supply 10 side, the first and second switching devices are turned OFF, and the third and fourth switching devices are turned ON; and for the phase in which the current flows from the single-phase AC power supply 10 side into the power conversion apparatus 200, the first, second, and fourth switching devices are turned OFF, and the third switching device is turned ON.

Specifically, in the case of FIG. 8(a) in which control is performed such that the positive electrode-side filter capacitor 11a is charged, the first switching device 17a of the phase in which the current flows out from the power conversion apparatus 200 side to the single-phase AC power supply 10 side is turned OFF from ON, the third and fourth switching devices 17c and 17d of the phase are kept OFF, and the second switching device 17b of the phase is kept ON. The third switching device 17g of the phase in which the current flows from the single-phase AC power supply 10 side into the power conversion apparatus 200 is turned OFF from ON, the first switching device 17e of the phase is turned ON from OFF, the second switching device 17f of the phase is kept ON, and the fourth switching device 17h of the phase is kept OFF.

In addition, in the case of FIG. 8(b) in which control is performed such that the negative electrode-side filter capacitor 11b is charged, the first and second switching devices 17a and 17b of the phase in which the current flows out from the power conversion apparatus 200 side to the single-phase AC power supply 10 side are turned OFF from ON, and the third and fourth switching devices 17c and 17d of the phase are turned ON from OFF. The second switching device 17f of the phase in which the current flows from the single-phase AC power supply 10 side into the power conversion apparatus 200 is turned OFF from ON, the first and fourth switching devices 17e and 17h of the phase are kept OFF, and the third switching device 17g of the phase is kept ON.

In the present embodiment, attenuation of the current slows down as compared to Embodiment 4. However, in the present embodiment as well, a current does not flow only in the diode, and is divided and flows in the switching device and the diode. Thus, it is possible to protect the current-passed diode from being deteriorated or broken. Particularly, when a body diode of the switching device is used as the diode, the effect is increased since the overcurrent capacity of the body diode is low.

It should be noted that the same method as that described in the above Embodiment 3 may be used as a method for determining which to select the positive electrode-side filter capacitor 11a or the negative electrode-side filter capacitor 11b as a charging target in the charge ON-OFF control mode in the present embodiment.

As described above, in Embodiment 5 of the present invention, in the single-phase three-level converter as the power conversion apparatus, when an overcurrent is detected, the ON-OFF control mode that has been set for the switching devices is switched to the charge ON-OFF control mode in which either the positive electrode-side filter capacitor or the negative electrode-side filter capacitor is charged and which is the current reduction ON-OFF control mode in which the current having flowed is reduced. Thus, the switching device connected in parallel with the diode through which the current is passed at the same time is turned ON, and the current is divided and flows also in the switching device. Therefore, the current flowing in the diode is considerably reduced, deterioration or breakage of the diode due to occurrence of an overcurrent is prevented, and the durability is improved.

Embodiment 6

Figure 9:
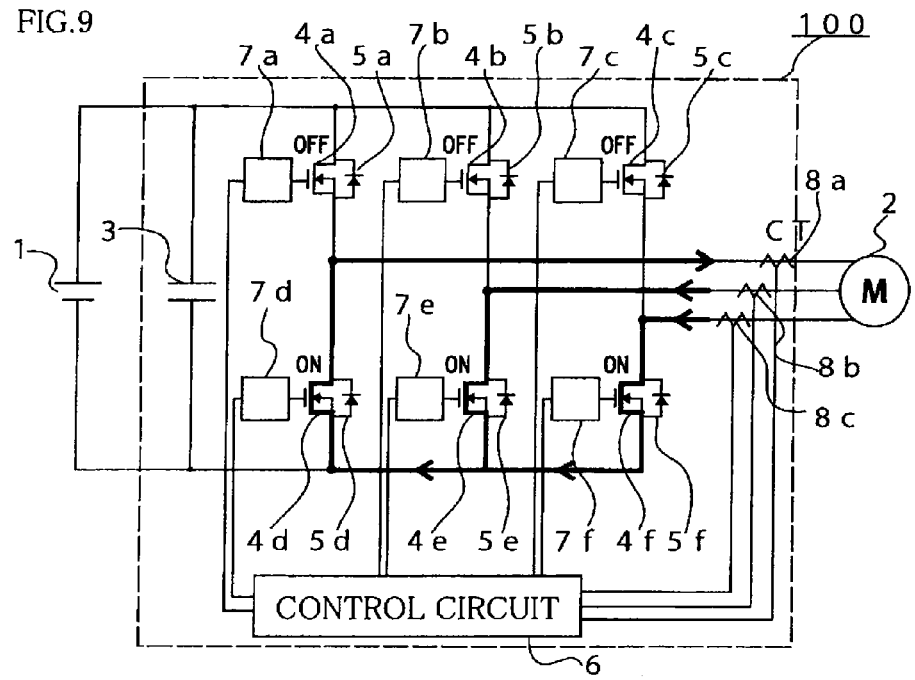
FIG. 9 is a circuit diagram showing an operation of a power conversion apparatus according to Embodiment 6 of the present invention at a time of overcurrent detection.

FIG. 9 shows a circuit diagram of a power conversion apparatus according to Embodiment 6 of the present invention. FIG. 9 shows a case of the same two-level power conversion apparatus as the power conversion apparatus described in the above Embodiment 1, but shows a case where a control method is different from that in Embodiment 1. Specifically, in Embodiment 1, the charge ON-OFF control mode is used as the current reduction ON-OFF control mode to be switched when an overcurrent is detected, and the control circuit 6 detects the flowing direction of the current and controls the switching devices. However, since the control circuit 6 needs to detect the flowing direction of the current and to determine which device is to be switched, it takes time to start the protection operation in some cases.

In contrast, in the present embodiment, as a current reduction ON-OFF control mode, a back-flow ON-OFF control mode is used in which the filter capacitor 3 is not included in a current passing path, and it is a method for shortening a calculation time associated with switching to shorten the time to the protection operation.

FIG. 9 shows a current path after a protection operation is performed from the same overcurrent occurrence state as shown in FIG. 2(a) described in Embodiment 1. In this method, when an overcurrent is detected, all the switching devices of the upper arms are controlled to be OFF, and all the switching devices of the lower arms are controlled to be ON. In the example of FIG. 9, from the state of FIG. 2(a) in which the overcurrent flows through the switching device 4a, the switching device 4a in which the overcurrent flows is turned OFF, the switching device 4d which is the switching device of the lower arm is turned ON, and for the other phases, the switching devices 4e and 4f of the lower arms are already ON and thus are kept in the states. The current flows back through the switching device 4d, the diode 5d, and the switching devices 4e and 4f. Due to this control, while being reduced, the current is divided and flows in the switching device 4d and the diode 5d without flowing only in the diode 5d. Thus, it is possible to prevent the diode from being deteriorated or broken. In addition, in this method, it is only necessary to determine whether or not it is an overcurrent, and it is not necessary to determine which switching device to be controlled to be ON or OFF, on the basis of the direction of the current. Thus, it is possible to shorten the calculation time associated with switching to shorten the time to the protection operation.

In addition, as the back-flow ON-OFF control mode, FIG. 9 shows the example in which all the switching devices of the upper arms are controlled to be OFF and all the switching devices of the lower arms are controlled to be ON. However, all the switching devices of the lower arms may be controlled to be OFF, and all the switching devices of the upper arms may be controlled to be ON. With regard to whether all the switching devices of the lower arms are turned ON or all the switching devices of the upper arms are turned ON, for example, control may be performed such that: when the switching device of the upper arm of a phase in which an overcurrent is detected is ON (this case corresponds to the case of FIG. 2(a)), all the switching devices of the lower arms are turned ON; and when the switching device of the lower arm of the phase in which the overcurrent is detected is ON, all the switching devices of the upper arms are turned ON.

In addition, in this method, the current continuously flows back, and thus attenuation of the current is slow as compared to Embodiments 1 to 5. Thus, first, switching may be performed to the back-flow ON-OFF control mode in which the current is caused to flow back by this protection method, then the direction of the current may be detected, and the charge ON-OFF control mode for speeding up attenuation of the current may be performed. In other words, as shown in FIG. 2(b), the switching device of the upper arm of the phase in which the current flows out from the power conversion apparatus 100 side to the motor 2 on the AC side is turned OFF, the switching device of the lower arm of the phase is turned ON, the switching devices of the lower arm of the phase in which the current flows from the motor 2 on the AC side into the power conversion apparatus 100 are turned OFF, and the switching devices of the upper arm of the phase are turned ON. By performing such control, it is possible to speed up attenuation of the current to reliably protect the device from an overcurrent.

As described above, in Embodiment 6 of the present invention, in the three-phase two-level inverter as the power conversion apparatus, when an overcurrent is detected, the ON-OFF control mode that has been set for the switching devices is switched to the back-flow ON-OFF control mode in which the filter capacitor is not included in a current passing path and which is the current reduction ON-OFF control mode in which the current having flowed is reduced. Thus, the switching device connected in parallel with the diode through which the current is passed at the same time is turned ON, and the current is divided and flows also in the switching device. Therefore, the current flowing in the diode is reduced, deterioration or breakage of the diode due to occurrence of an overcurrent is prevented, and the durability is improved.

It should be noted that the case of, as the power conversion apparatus, the inverter which converts DC power to AC power has been described in this example, but the power conversion apparatus may be a converter which converts AC power to DC power as long as the converter includes switching devices in upper arms and lower arms and diodes in parallel with the switching devices.

Embodiment 7

Figure 10:
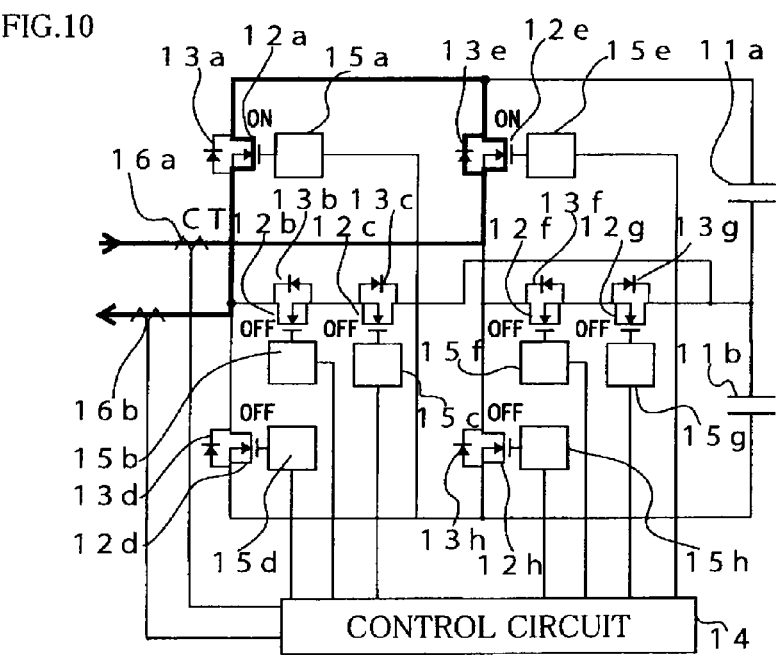
FIG. 10 is a circuit diagram showing an operation of a power conversion apparatus according to Embodiment 7 of the present invention at a time of overcurrent detection.

FIG. 10 shows a circuit diagram of a power conversion apparatus according to Embodiment 7 of the present invention. The same control method as that in Embodiment 6 is also applicable to the three-level power conversion apparatus described in the above Embodiment 2 or 4. In other words, the present embodiment relates to a case of switching to a back-flow ON-OFF control mode as a current reduction ON-OFF control mode as described in Embodiment 6, in a three-level power conversion apparatus having the same circuit configuration as those in the above Embodiments 2 and 3.

In the case of use in the three-level power conversion apparatus shown in FIG. 10, since the three-level power conversion apparatus includes a positive electrode, a negative electrode, and an intermediate electrode, there are a method in which the switching devices of the upper arms are turned ON to cause back-flow, a method in which the switching devices of the lower arms are turned ON to cause back-flow, and a method in which the switching devices of the intermediate arms are turned ON to cause back-flow.

In the case where from the overcurrent occurrence state shown in FIG. 4(a) in Embodiment 2, the upper arms are turned ON to switch to the back-flow ON-OFF control mode, the switching devices 12b, 12c, 12f, and 12g of the intermediate arms and the switching devices 12d and 12h of the lower arms are controlled to be OFF, and the switching devices 12a and 12e of the upper arms are controlled to be ON, as shown in FIG. 10. In the case where the lower arms are turned ON to cause back-flow, the switching devices 12b, 12c, 12f, and 12g of the intermediate arms and the switching devices 12a and 12e of the upper arms are controlled to be OFF, and the switching devices 12d and 12h of the lower arms are controlled to be ON.

Figure 11:
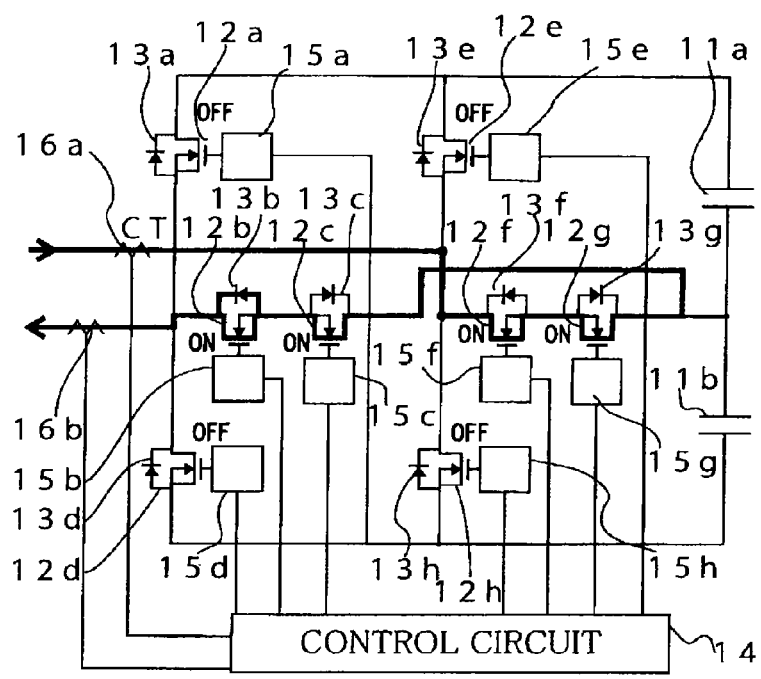
FIG. 11 is a circuit diagram showing an operation of the power conversion apparatus according to Embodiment 7 of the present invention at a time of overcurrent detection, which operation is different from that in FIG. 10.

In addition, in the case where back-flow is caused through the switching devices of the intermediate arms, the switching devices 12a and 12e of the upper arms and the switching devices 12d and 12h of the lower arms are controlled to be OFF, and the switching devices 12b, 12c, 12f, and 12g of the intermediate arms are controlled to be ON, as shown in FIG. 11.

Due to such control, even in the three-level power conversion apparatus as shown in FIG. 10, an overcurrent does not continuously flow only in the diode, and it is possible to prevent the diode from being deteriorated or broken.

It should be noted that in the three-level power conversion apparatus as well, after back-flow is caused by this method, the direction of the current may be detected, and control may be performed such that attenuation of the current is sped up.

Embodiment 8

Figure 12:
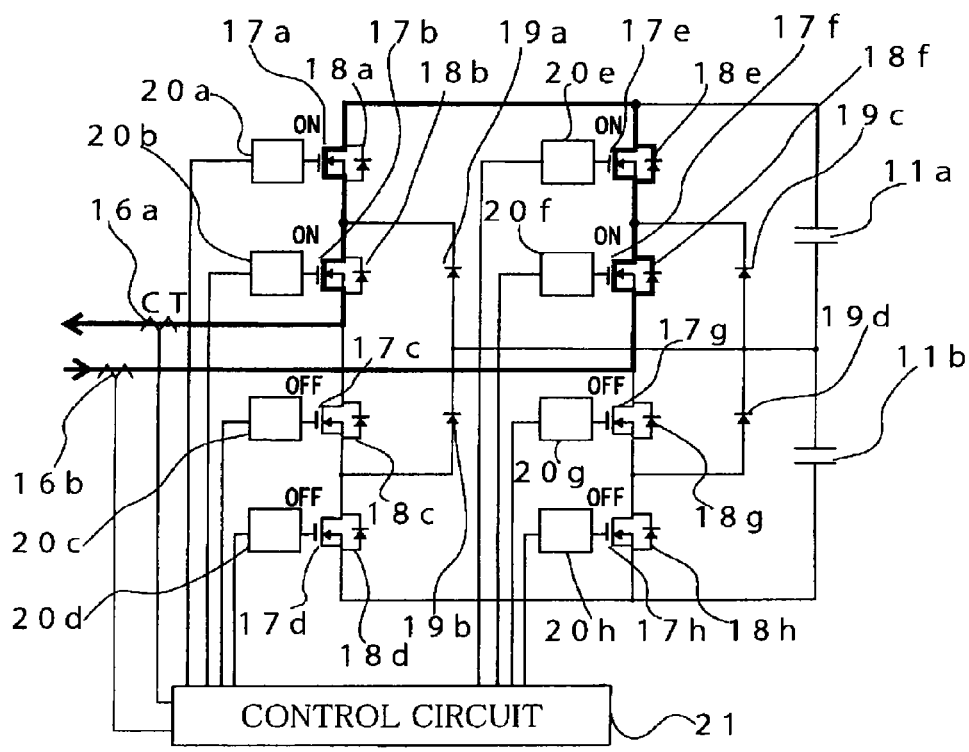
FIG. 12 is a circuit diagram showing an operation of a power conversion apparatus according to Embodiment 8 of the present invention at a time of overcurrent detection.

FIG. 12 shows a circuit diagram of a power conversion apparatus according to Embodiment 8 of the present invention. The present embodiment relates to a case of switching to a back-flow ON-OFF control mode as a current reduction ON-OFF control mode as described in Embodiment 6, in a three-level power conversion apparatus having the same circuit configuration as that in FIG. 6 in the above Embodiment 4.

Figure 13:
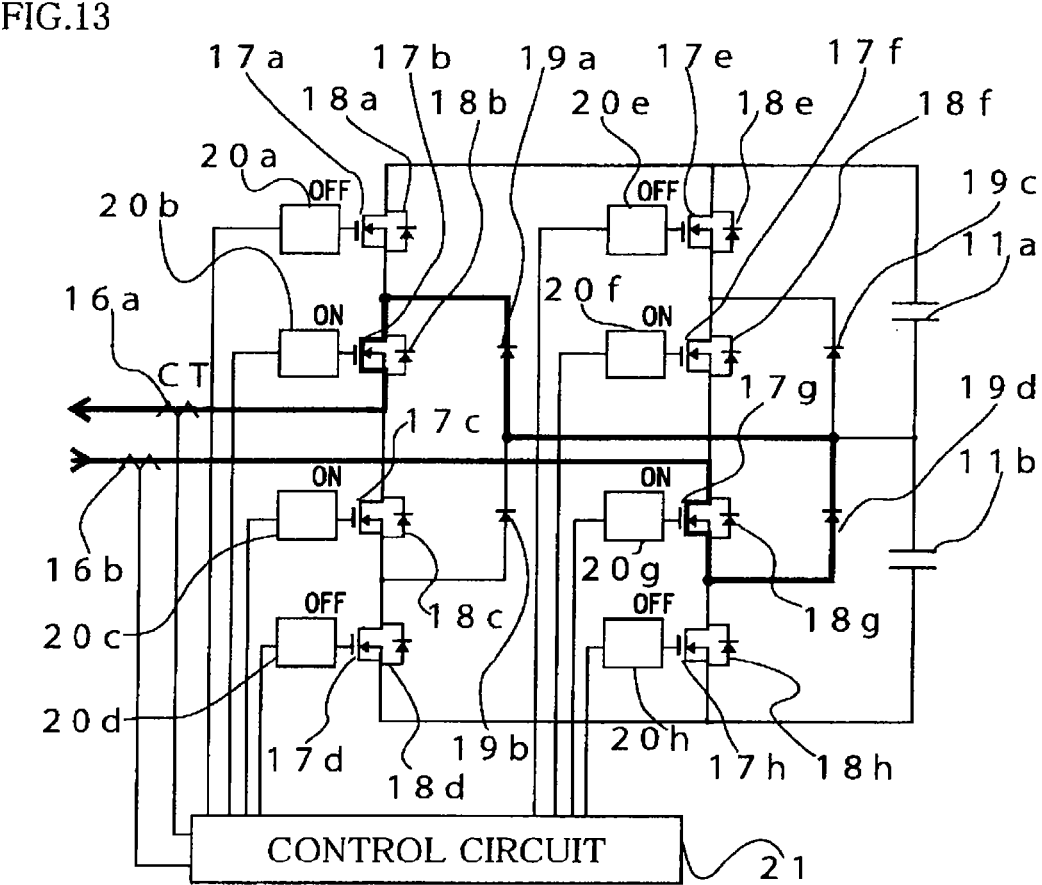
FIG. 13 is a circuit diagram showing an operation of the power conversion apparatus according to Embodiment 8 of the present invention at a time of overcurrent detection, which operation is different from that in FIG. 12.

In the case where from the overcurrent occurrence state shown in FIG. 7(a) in Embodiment 4, the upper arms are turned ON to switch to the back-flow ON-OFF control mode, the switching devices 17c, 17d, 17g, and 17h of the lower arms are controlled to be OFF, and the switching devices 17a, 17b, 17e, and 17f of the upper arms are controlled to be ON, as shown in FIG. 12. In the case where the lower arms are turned ON to cause back-flow, the switching devices 17a, 17b, 17e, and 17f of the upper arms are controlled to be OFF, and the switching devices 17c, 17d, 17g, and 17h of the lower arms are controlled to be ON. In the case where back-flow is caused through the clamping diodes, the switching devices 17a and 17e connected to the positive electrode and the switching devices 17d and 17h connected to the negative electrode are controlled to be OFF, and the switching devices 17b, 17c, 17f, and 17g are controlled to be ON, as shown in FIG. 13.

Due to such control, even in the three-level power conversion apparatus as shown in FIG. 12, an overcurrent does not continuously flow only in the diode, and it is possible to prevent the diode from being deteriorated or broken. It should be noted that in the three-level power conversion apparatus as well, after back-flow is caused by this method, the direction of the current may be detected, and control may be performed such that attenuation of the current is sped up.

Embodiment 9

Figure 14:
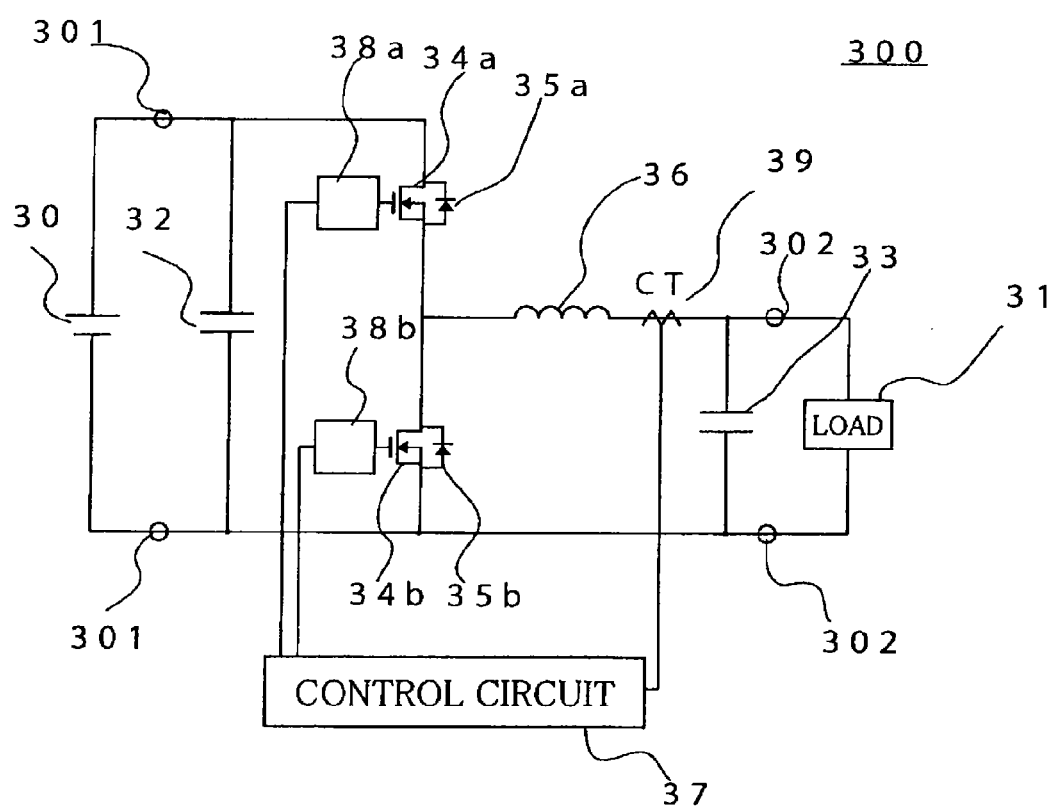
FIG. 14 is a circuit diagram showing a power conversion apparatus according to Embodiment 9 of the present invention.

FIG. 14 shows a circuit diagram of a power conversion apparatus according to Embodiment 9 of the present invention. In each of the above embodiments, the power conversion apparatus which performs conversion between DC power and AC power has been described. However, in this embodiment, a chopper apparatus 300 which steps down a voltage of a DC power supply 30 on a high-voltage side to a low voltage and supplies the low voltage to a load 31 will be described as an example of the power conversion apparatus which performs conversion between DC power and DC power.

First and second capacitors 32 and 33 are provided at first input-output terminals 301 on the high-voltage side and second input-output terminals 302 on a low-voltage side, respectively. Switching devices 34a and 34b are connected in series with each other between a positive electrode and a negative electrode on the high-voltage side. Each of the switching devices 34a and 34b is configured by using a device switchable between a forward direction and a reverse direction, such as a MOSFET. Diodes 35a and 35b are connected in parallel with the switching devices 34a and 34b, the switching device 34a and the diode 35a mounted on the positive electrode side constitute an upper arm, and the switching device 34b and the diode 35b mounted on the negative electrode side constitute a lower arm.

A series connection point between the switching device 34a of the upper arm and the switching device 34b of the lower arm is an output point and is connected to the load 31 via a reactor 36. A control circuit 37 outputs, to driving circuits 38a and 38b, control signals for turning ON and OFF the switching devices 34a and 34b, and the driving circuits 38a and 38b drive the switching devices 34a and 34b on the basis of the control signals. A current flowing in the reactor 36 is detected by a current detector 39, and the control circuit 37 receives a detection signal of the current detector 39 and includes: an overcurrent detection section which determines whether or not an overcurrent flows, namely, that a current detection value exceeds a predetermined overcurrent setting value; and a current direction detection section which detects the current direction of the current detected by the current detector 39.

In the chopper apparatus 300 shown in FIG. 14, power supply from the DC power supply 30 to the load 31 and power regeneration from the load 31 are performed through an ON/OFF operation of the switching device 34a of the upper arm and an ON/OFF operation of the switching device of the lower arm. In such a chopper apparatus as well, in a normal state, the synchronous rectification method is used in which when a current flows in the forward direction of the diode, the switching device connected in parallel with the diode is turned ON. Thus, it is possible to cause the current flowing in the diode to be divided and flow in the switching device, it is possible to decrease the capacity of the diode, and in some cases, it is also possible to use a body diode of the switching device.

Figure 15:
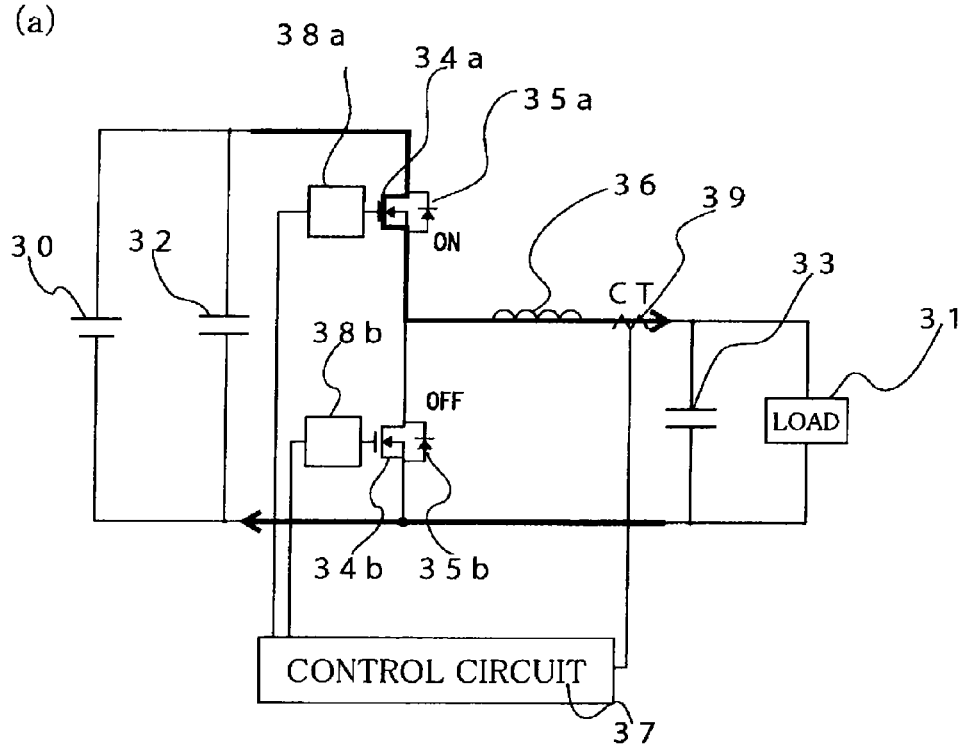
FIG. 15 is a circuit diagram showing an operation of the power conversion apparatus according to Embodiment 9 of the present invention at a time of overcurrent detection.
Figure 15:
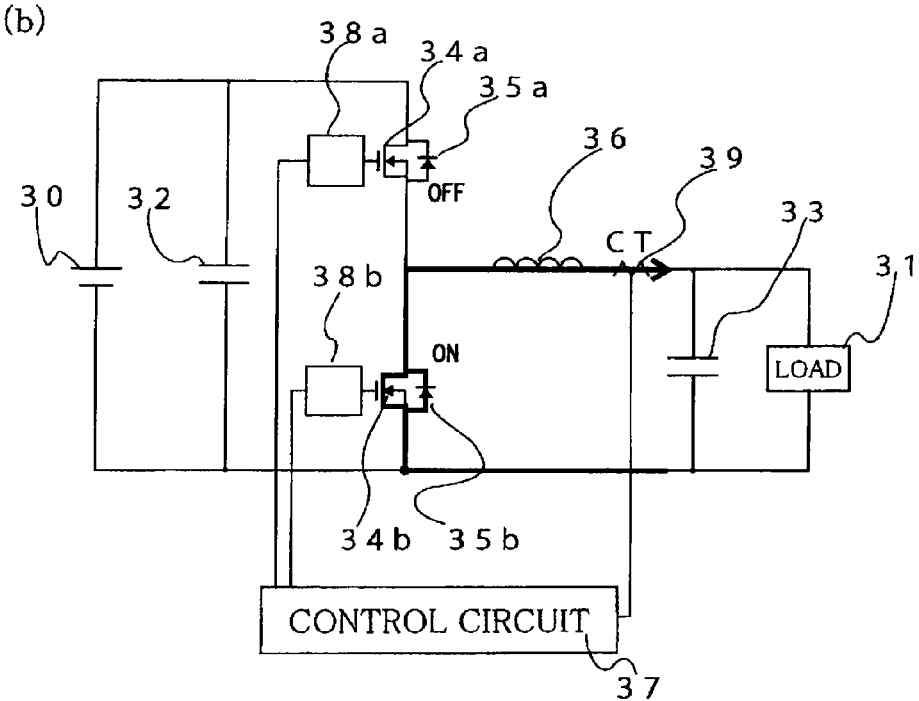

Next, an operation at a time of overcurrent occurrence will be described with reference to FIG. 15. FIG. 15(a) shows a state in which an overcurrent flows, and a case is assumed in which the switching device 34a is ON and the current flows in the forward direction of the switching device 34a. When the overcurrent flows, the control circuit 37 receives a detection signal from the current detector 39, detects the overcurrent, and determines which switching device is to be turned ON and which switching device is to be turned OFF, on the basis of the flowing direction of the current.

In other words, when the current flows out from the series connection point between the upper and lower arms within the chopper apparatus 300, which is the power conversion apparatus, to the load 31 side, the switching device of the upper arm is turned OFF, and the switching device of the lower arm is turned ON; and when the current flows from the load 31 side through the series connection point into the chopper apparatus 300 side, the switching device of the lower arm is turned OFF, and the switching device of the upper arm is turned ON. FIG. 15(b) shows a state after the overcurrent protection operation. In this example, the switching device 34a of the upper arm is turned OFF, and the switching device 34b of the lower arm is turned ON. By performing such control, a circuit operation is performed in which the second capacitor 33 is charged while the current is divided and flows in the diode and the switching device, and thus the current is attenuated.

In other words, when the overcurrent detection section detects occurrence of an overcurrent, the control circuit 37 switches the ON-OFF control mode for each switching device to a current reduction ON-OFF control mode in which a current having flowed is reduced. Here, the current reduction ON-OFF control mode is a charge ON-OFF control mode in which the second capacitor 33 is charged, and the switching device 34b which is caused to perform an ON-operation in this control mode has a role in causing a current flowing in the diode 35b, which is connected in parallel with the switching device 34b, to be divided and flow in the diode 35b and the switching device 34b, thereby further reducing the current flowing in this diode.

Then, after the current is reduced to such an extent as not to influence deterioration and breakage of the diode and becomes equal to or less than a predetermined lower limit, the switching device that has been ON is turned OFF, whereby it is possible to block the current.

As described above, in Embodiment 9 of the present invention, in the chopper apparatus as the power conversion apparatus, when an overcurrent is detected, the ON-OFF control mode that has been set for the switching devices is switched to the charge ON-OFF control mode in which the capacitor is charged and which is the current reduction ON-OFF control mode in which the current having flowed is reduced. Thus, the switching device connected in parallel with the diode through which the current is passed at the same time is turned ON, and the current is divided and flows also in the switching device. Therefore, the current flowing in the diode is considerably reduced, deterioration or breakage of the diode due to occurrence of an overcurrent is prevented, and the durability is improved.

Particularly, when a body diode of the switching device is used as the diode, the effect is increased since the overcurrent capacity of the body diode is low.

It should be noted that the case where power is supplied from the DC power supply disposed on the high-voltage side to the load disposed on the low-voltage side has been described in the present embodiment, but the present embodiment is also similarly applicable to a case where a voltage of a DC power supply disposed on a low-voltage side is stepped up and supplied to a load disposed on a high-voltage side.

Embodiment 10

The switching devices, the diodes, and the clamping diodes used in the above Embodiments 1 to 9 may be those formed from silicon, or may be formed of wide-gap semiconductors having large band gaps as compared to those of silicon. Examples of wide-gap semiconductors include silicon carbide, gallium nitride materials, or diamond. When wide-gap semiconductors are used, the allowable current density is high, and the power loss is also low. Thus, it is possible to decrease the size of the apparatus. In addition, when wide-gap semiconductors are used for the switching devices, the withstand voltage of each device switchable between both directions, such as a MOSFET, is increased, and it is possible to use each device also in a high-voltage region.

It should be noted that when all of the switching devices, the diodes, and the clamping diodes are formed of wide-gap semiconductors, the effect of decreasing the size of the apparatus is great, but even when only some of them are formed of wide-gap semiconductors, the effect is provided.

The invention claimed is:
1. A power conversion apparatus comprising:
 a positive electrode and a negative electrode constituting first input-output terminals; and
 upper arms and lower arms connected in series with each other between the positive electrode and the negative electrode of the first input-output terminals, wherein
 series connection points between the upper arms and the lower arms are connected to second input-output terminals, each of the upper arms and the lower arms includes switching devices switchable between a forward direction and a reverse direction and diodes connected in parallel with the switching devices, the power conversion apparatus includes a control circuit for performing ON-OFF control for the switching devices, current detectors for detecting current flowing in connection portions between the series connection points and the second input-output terminals, and an overcurrent detection section for detecting that a current detection value from the current detectors exceeds a predetermined overcurrent setting value, and when the overcurrent detection section detects an overcurrent, the control circuit switches the ON-OFF control for the switching devices to a current reduction ON-OFF control mode which is a mode in which a current having flowed is reduced and in which when the mode is a mode in which a current is passed through any of the respective diodes connected in parallel with the switching devices, the switching devices connected in parallel with the diodes in which the current is passed among the respective diodes are turned ON, further the current having flowed is divided and flows in both the diodes in which the current is passed among the respective diodes and the switching devices connected in parallel with the diodes in which the current is passed among the respective diodes.

2. The power conversion apparatus according to claim 1, wherein a capacitor is connected between the positive electrode and the negative electrode, the upper arms and the lower arms are provided for each phase, and DC/AC conversion is performed between the first input-output terminals to which a DC voltage is applied and the second input-output terminals to which an AC voltage is applied.

3. The power conversion apparatus according to claim 2, wherein the current reduction ON-OFF control mode is a charge ON-OFF control mode in which an operation of charging the capacitor is performed.

4. The power conversion apparatus according to claim 3, further comprising a current direction detection section for detecting a current direction of a current detected by the current detector, wherein in the charge ON-OFF control mode the switching devices of the upper arms of a phase for which a current direction detected by the current direction detection section is a flowing-out direction from the series connection points are turned OFF, the switching devices of the lower arms of the phase are turned ON, the switching devices of the lower arms of a phase for which a current direction detected by the current direction detection section is a flowing-in direction to the series connection points are turned OFF, and the switching devices of the upper arms of the phase are turned ON; and when the intermediate arms are provided, the intermediate arms of all phases are turned OFF.

5. The power conversion apparatus according to claim 2, wherein the current reduction ON-OFF control mode is a back-flow ON-OFF control mode in which a back-flow operation is performed without including the capacitor in a current passing path.

6. The power conversion apparatus according to claim 5, wherein in the back-flow ON-OFF control mode the switching devices of the upper arms of all phases are turned OFF and the switching devices of the lower arms of all the phases are turned ON, or the switching devices of the upper arms of all the phases are turned ON and the switching devices of the lower arms of all the phases are turned OFF; and when the intermediate arms are provided, the intermediate arms of all the phases are turned OFF.

7. The power conversion apparatus according to claim 2, wherein the current reduction ON-OFF control mode is a mode which once shifts to a back-flow ON-OFF control mode in which a back-flow operation is performed without including the capacitor in a current passing path; and then shifts to a charge ON-OFF control mode in which an operation of charging the capacitor is performed.

8. The power conversion apparatus according to claim 2, further comprising an intermediate electrode in addition to the positive electrode and the negative electrode, wherein the power conversion apparatus comprises, as the capacitor, a positive electrode-side capacitor connected between the positive electrode and the intermediate electrode and a negative electrode-side capacitor connected between the intermediate electrode and the negative electrode, the power conversion apparatus comprises intermediate arms connected between the intermediate electrode and the series connection points of each phase in addition to the upper arms and the lower arms as a parallel body of the switching devices and the diodes, and potentials of three levels are allowed to be outputted to the second input-output terminals.

9. The power conversion apparatus according to claim 8, wherein the current reduction ON-OFF control mode is a charge ON-OFF control mode in which an operation of charging either one of the positive electrode-side capacitor or the negative electrode-side capacitor is performed.

10. The power conversion apparatus according to claim 2, further comprising an intermediate electrode in addition to the positive electrode and the negative electrode, wherein the power conversion apparatus comprises, as the capacitor, a positive electrode-side capacitor connected between the positive electrode and the intermediate electrode and a negative electrode-side capacitor connected between the intermediate electrode and the negative electrode, the power conversion apparatus comprises, as the upper arm, first and second switching devices each of which is the switching device connected in parallel with the diodes and which are connected in series with each other, the power conversion apparatus comprises, as the lower arm, third and fourth switching devices each of which is the switching device connected in parallel with the diodes and which are connected in series with each other, the power conversion apparatus comprises clamping diodes inserted between the intermediate electrode and connection points between the first and second switching devices and between the intermediate electrode and connection points between the third and fourth switching devices, respectively, and potentials of three levels are allowed to be outputted to the second input-output terminals.

11. The power conversion apparatus according to claim 2, wherein after switching to the current reduction ON-OFF control mode, the control circuit turns OFF the switching device connected in parallel with the diode in which the current is passed among the respective diodes, in order from a phase for which a current detection value from the current detector becomes equal to or less than a predetermined lower limit.

12. The power conversion apparatus according to claim 1, wherein a first capacitor is connected between the positive electrode and the negative electrode, a second capacitor is connected between a positive electrode and a negative electrode constituting the second input-output terminals, reactors are inserted and connected between the series connection points and the positive electrode of the second input-output terminals, and DC/DC conversion is performed between the first input-output terminals to which a DC voltage is applied and the second input-output terminals to which a DC voltage is applied.

13. The power conversion apparatus according to claim 1, wherein after switching to the current reduction ON-OFF control mode, when a current detection value from the current detector becomes equal to or less than a predetermined lower limit, the control circuit turns OFF the switching devices connected in parallel with the diodes in which the current is passed among the respective diodes.

14. The power conversion apparatus according to claim 1, wherein all or some of semiconductor devices constituting the switching devices and the diodes are formed of wide-gap semiconductors.

15. The power conversion apparatus according to claim 14, wherein the wide-gap semiconductors are silicon carbide, gallium nitride, or diamond.

16. A power conversion apparatus comprising:

a positive electrode and a negative electrode constituting first input-output terminals; and one upper arm and one lower arm connected in series with each other between the positive electrode and the negative electrode of the first input-output terminals, wherein one series connection point between the upper arm and the lower arm is connected to one of second input-output terminals, each of the upper arm and the lower arm includes switching devices switchable between a forward direction and a reverse direction and respective diodes connected in parallel with the switching devices, the power conversion apparatus includes a control circuit for performing ON-OFF control for the switching devices, one current detector for detecting current flowing in a connection portion between the series connection point and the second input-output terminal, and an overcurrent detection section for detecting that a current detection value from the current detector exceeds a predetermined overcurrent setting value, a first capacitor is connected between the positive electrode and the negative electrode, a second capacitor is connected between a positive electrode and a negative electrode constituting the second input-output terminals, a reactor is inserted and connected between the series connection point and the positive electrode of the second input-output terminals, and DC/DC conversion is performed between the first input-output terminals to which a DC voltage is applied and the second input-output terminals to which a DC voltage is applied, and when the overcurrent detection section detects an overcurrent, the control circuit switches the ON-OFF control for the switching devices to a current reduction ON -OFF control mode which is a mode in which a current having flowed is reduced and in which when the mode is a mode in which a current is passed through any of the respective diodes connected in parallel with the switching devices, the switching device connected in parallel with the diode in which the current is passed among the respective diodes is turned ON, further the current having flowed is divided and flows in both the diode in which the current is passed among the respective diodes and the switching device connected in parallel with the diode in which the current is passed among the respective diodes.

* * * * *